(12) United States Patent
Yamaguchi et al.

(10) Patent No.: US 10,468,677 B2
(45) Date of Patent: Nov. 5, 2019

(54) SPINEL-TYPE LITHIUM-MANGANESE-CONTAINING COMPLEX OXIDE

(71) Applicant: Mitsui Mining & Smelting Co., Ltd., Tokyo (JP)

(72) Inventors: Kyohei Yamaguchi, Takehara (JP); Tetsuya Mitsumoto, Takehara (JP); Hideaki Matsushima, Takehara (JP); Shinya Kagei, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 16/080,175

(22) PCT Filed: Feb. 28, 2017

(86) PCT No.: PCT/JP2017/007698
§ 371 (c)(1),
(2) Date: Aug. 27, 2018

(87) PCT Pub. No.: WO2017/150504
PCT Pub. Date: Sep. 8, 2017

(65) Prior Publication Data
US 2019/0051900 A1    Feb. 14, 2019

(30) Foreign Application Priority Data
Feb. 29, 2016   (JP) .................................. 2016-038060

(51) Int. Cl.
*H01M 4/505*   (2010.01)
*C01G 53/00*   (2006.01)
(Continued)

(52) U.S. Cl.
CPC ............ *H01M 4/505* (2013.01); *C01G 45/02* (2013.01); *C01G 53/00* (2013.01); *H01M 4/36* (2013.01);
(Continued)

(58) Field of Classification Search
None
See application file for complete search history.

(56) References Cited

U.S. PATENT DOCUMENTS

| | | |
|---|---|---|
| 6,337,158 B1 | 1/2002 | Nakajima et al. |
| 8,114,309 B2 | 2/2012 | Kajiya et al. |

(Continued)

FOREIGN PATENT DOCUMENTS

| | | |
|---|---|---|
| CN | 102149641 A | 8/2011 |
| CN | 103872311 | 6/2014 |

(Continued)

OTHER PUBLICATIONS

Machine Translation of JP 2008-147068 A (Year: 2008).*

*Primary Examiner* — Robert S Carrico
(74) *Attorney, Agent, or Firm* — The Web Law Firm

(57) ABSTRACT

Provided is a spinel-type lithium-manganese-containing complex oxide that is related to a 5 V-class spinel, and with which output characteristics and charge-discharge cycle ability can be enhanced while suppressing gas generation. Proposed is a spinel-type lithium-manganese-containing complex oxide comprising at least Li, Mn, O, and two or more other elements, and having an operating potential of 4.5 V or more with respect to a metal Li reference potential, wherein: D50 is 0.5 to 9 μm; a value of (|mode diameter−D50|/mode diameter)×100 is 0 to 25%; a value of (|mode diameter−D10|/mode diameter)×100 is 20 to 58%; a ratio of average primary particle diameter/D50, which is calculated from an average primary particle diameter calculated from a (Continued)

SEM image and the $D_{50}$, is 0.20 to 0.99; and a primary particle is a polycrystal.

22 Claims, 1 Drawing Sheet

(51) Int. Cl.
| | |
|---|---|
| *H01M 4/36* | (2006.01) |
| *H01M 4/525* | (2010.01) |
| *C10G 45/02* | (2006.01) |
| *H01M 10/052* | (2010.01) |
| *H01M 4/02* | (2006.01) |
| *C01G 45/02* | (2006.01) |

(52) U.S. Cl.
CPC ......... *H01M 4/525* (2013.01); *H01M 10/052* (2013.01); *C01P 2002/32* (2013.01); *C01P 2006/16* (2013.01); *H01M 2004/021* (2013.01); *H01M 2004/028* (2013.01)

(56) References Cited

U.S. PATENT DOCUMENTS

| | | |
|---|---|---|
| 8,852,811 B2 | 10/2014 | Koga et al. |
| 9,240,595 B2 | 1/2016 | Kagei et al. |
| 9,478,808 B2 | 10/2016 | Takei et al. |
| 9,537,140 B2 | 1/2017 | Shibamura et al. |
| 2009/0289218 A1 | 11/2009 | Kajiya et al. |
| 2011/0210287 A1 | 9/2011 | Koga et al. |
| 2014/0034872 A1 | 2/2014 | Watanabe et al. |
| 2014/0162119 A1 | 6/2014 | Takei et al. |
| 2014/0252268 A1 | 9/2014 | Kagei et al. |
| 2015/0104644 A1* | 4/2015 | Iwata ..................... C01G 45/00 428/402 |
| 2015/0147652 A1 | 5/2015 | Shibamura et al. |
| 2015/0255791 A1* | 9/2015 | Kagei ................... H01M 4/505 429/224 |
| 2016/0093882 A1 | 3/2016 | Kagei et al. |
| 2016/0111716 A1* | 4/2016 | Kagei ................... H01M 4/366 429/224 |
| 2016/0156033 A1* | 6/2016 | Fujii ................. H01M 10/0525 429/223 |

FOREIGN PATENT DOCUMENTS

| | | | |
|---|---|---|---|
| EP | 2172996 A1 | | 4/2010 |
| JP | 11-073962 A | | 3/1999 |
| JP | 2000-235857 A | | 8/2000 |
| JP | 2003-197194 A | | 7/2003 |
| JP | 2008147068 A | * | 6/2008 |
| JP | 2012-216548 A | | 11/2012 |
| JP | 2014-130851 A | | 7/2014 |
| JP | 2014-139119 A | | 7/2014 |
| JP | 2014-166951 A | | 9/2014 |
| JP | 2015-140292 A | | 8/2015 |
| JP | 2015-140297 A | | 8/2015 |
| WO | 2014/185548 A1 | | 11/2014 |
| WO | WO-2014185547 A1 | * | 11/2014 ............ H01M 4/366 |

* cited by examiner

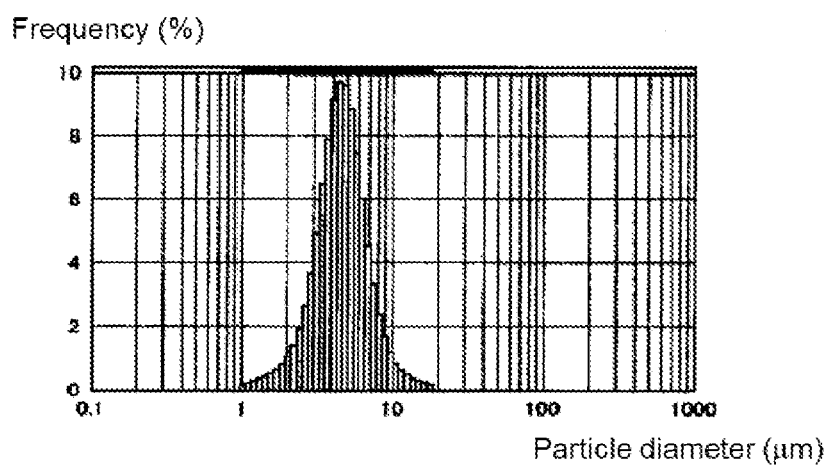

SPINEL-TYPE LITHIUM-MANGANESE-CONTAINING COMPLEX OXIDE

CROSS-REFERENCE TO RELATED APPLICATIONS

This application is the United States national phase of International Application No. PCT/JP2017/007698 filed Feb. 28, 2017, and claims priority to Japanese Patent Application No. 2016-038060 filed Feb. 29, 2016, the disclosures of which are hereby incorporated in their entirety by reference.

TECHNICAL FIELD

The present invention relates to a spinel-type lithium-manganese-containing complex oxide that can be used as a positive electrode active material for lithium secondary batteries, and particularly, to a 5 V-class spinel-type lithium-manganese-containing complex oxide having an operating potential of 4.5 V or more with respect to a metal Li reference potential.

BACKGROUND ART

Lithium secondary batteries have characteristics of high energy density, long life and the like. Therefore, lithium secondary batteries are widely used as power supplies for electric appliances such as video cameras, portable electronic devices such as laptop computers and mobile telephones, and electric tools such as power tools. Recently, lithium secondary batteries are also applied to large-sized batteries that are mounted in electric vehicles (EVs), hybrid electric vehicles (HEVs) and the like.

A lithium secondary battery is a secondary battery having a structure in which, at the time of charging, lithium begins to dissolve as ions from the positive electrode and moves to the negative electrode to be stored therein, and at the time of discharging, lithium ions return from the negative electrode to the positive electrode, and it is known that the higher energy density of the lithium secondary battery is attributable to the electric potential of the positive electrode material.

Known examples of this kind of positive electrode active material for lithium secondary batteries include lithium transition metal oxides having a layered structure, such as $LiCoO_2$, $LiNiO_2$, and $LiMnO_2$, and spinel-type lithium-manganese-containing complex oxides having a manganese-based spinel structure (Fd-3m), such as $LiMn_2O_4$ and $LiNi_{0.5}Mn_{1.5}O_4$.

Since spinel-type lithium-manganese-containing complex oxides of this kind are provided at low prices of raw materials, are non-toxic and safe, and have properties of being resistant to over-charging, attention is paid to them as the next-generation positive electrode active material for the large-sized batteries of electric vehicles (EVs), hybrid electric vehicles (HEVs) and the like. Furthermore, since spinel-type lithium transition metal oxide (LMOs) that are capable of three-dimensionally intercalating and deintercalating of Li ions have superior output characteristics compared with lithium transition metal oxides having a layered structure such as $LiCoO_2$, it is expected to be used in an application where excellent output characteristics are required, such as in batteries for EVs and batteries for HEVs.

Among others, it has been known to have an operating potential at near 5 V by substituting a part of the Mn sites in $LiMn_2O_4$ with other transition metals (Cr, Co, Ni, Fe, or Cu). Thus, at present, development of a 5 V-class spinel-type lithium-manganese-containing complex oxide having an operating potential of 4.5 V or more with regard to a metal Li reference potential is being carried out.

For example, Patent Document JP H11-73962 A discloses, as a positive electrode active material for lithium secondary batteries exhibiting an electromotive force of 5 V-class, a high capacity spinel type lithium manganese composite oxide positive electrode active material, comprising a spinel-type lithium-manganese composite oxide added with chromium as an essential additive component, and further, nickel or cobalt.

Patent Document JP 2000-235857 A discloses a crystal having a spinel structure, $LiMn_{2-y-z}Ni_yM_zO_4$ (wherein M represents at least one selected from the group consisting of Fe, Co, Ti, V, Mg, Zn, Ga, Nb, Mo and Cu, $0.25 \leq y \leq 0.6$, and $0 \leq z \leq 0.1$), which performs charging and discharging at a potential of 4.5 V or more with respect to a Li metal.

Patent Document JP 2003-197194 A discloses, as a positive electrode active material capable of generating an electromotive force of 4.5 V or more and maintaining a discharge capacity, a positive electrode active material for secondary batteries containing a spinel-type lithium-manganese composite oxide represented by a general formula: $Lia(M_xMn_{2-x-y}A_y)O_4$ (wherein $0.4 < x$, $0 < y$, $x+y < 2$, $0 < a < 1.2$; M includes one or more metal elements selected from the group consisting of Ni, Co, Fe, Cr and Cu and contains at least Ni; A includes at least one metal element selected from Si and Ti, and in the case where A includes only Ti, the value of the ratio y of A is $0.1 < y$).

Patent Document JP 2014-130851 A discloses, in a spinel-type lithium-manganese-containing composite oxide having an operating potential of 4.5 V or more at a metal Li reference potential, a spinel-type lithium-manganese-containing composite oxide containing a crystal phase formed by substituting a part of the Mn site in $LiMn_2O_{4-\delta}$ with Li, a metal element M1 including Ni (M1 is a metal element containing at least one of Ni, Co, and Fe), and another metal element M2 (M2 is Ti or a metal element containing Ti and at least one of Mg, Al, Ba, Cr, and Nb), wherein the spinel-type lithium-manganese-containing composite oxide contains a composite oxide phase including Ni, Mn, and B.

Patent Document JP 2014-166951 A discloses a manganese-based spinel-type lithium transition metal oxide represented by $Li[Ni_yMn_{2-(a+b)-y-z}Li_aTi_bM_z]O_4$ (wherein $0 \leq z \leq 0.3$, $0.3 \leq y \leq 0.6$, and M is at least one or more metal elements selected from the group consisting of Al, Mg, Fe, and Co), wherein $a > 0$, $b > 0$, $2-(a+b)-y-z < 1.7$, and $3 \leq b/a \leq 8$ in the above formula.

PROBLEMS TO BE SOLVED BY THE INVENTION

A spinel-type lithium-manganese-containing complex oxide (also referred to as "5 V-class spinel") having an operating potential of 4.5 V or more has a problem which hardly occurs with a 4 V-class spinel-type lithium-manganese-containing complex oxide, that is, a characteristic problem in which the amount of gas generation generated by reacting with an electrolyte is large.

In order to solve such a problem, that is, to suppress the amount of gas generation, it was proposed that a primary particle diameter of the 5 V-class spinel was being made to large and a specific surface area (SSA) was then decreased, thereby suppressing the amount of gas generation. However, when the specific surface area is decreased, a contact area with an electrolyte solution becomes small, and thus a problem that the output characteristics are decreased occurs.

Accordingly, in regard to the 5 V-class spinel, the present invention is intended to propose a new spinel-type lithium-manganese-containing complex oxide, which can enhance the output characteristics and the charge-discharge cycle ability while suppressing the gas generation. Such a problem is defined as a first problem of the present invention.

Through searching a positive electrode active material capable of improving the gas generation and the charge-discharge cycle ability while maintaining or further enhancing the output characteristics, together with the first problem, the present inventors propose to coat a particle surface of the spinel-type lithium-manganese-containing complex oxide with a metal or a metal oxide, in order to enhance the cycle characteristics and to suppress the reaction between an electrolyte solution and the spinel-type lithium-manganese-containing complex oxide. However, a new problem that the rate characteristics of the battery are decreased by the coating occurs.

Accordingly, together with the first problem, the present invention is intended to propose a new spinel-type lithium-manganese-containing complex oxide capable of achieving the enhancement of the rate characteristics while enhancing the cycle characteristics and suppressing the gas generation, compared with a surface treated positive electrode active material that has been hitherto proposed. Such a problem is defined as a second problem of the present invention.

Furthermore, together with the first problem, the present inventors explored a positive electrode active material capable of achieving both the expansion of a high potential capacity region and the suppression of the gas generation while maintaining or enhancing the output characteristics.

It has been found that, in the 5 V-class spinel, the amount of gas generation increases, whereas a plateau region at near 4.5 V can be expanded, and the high potential capacity region can be expanded. For this reason, in regard to the 5 V-class spinel, it has been difficult to achieve both the increasing of energy density by expanding the high potential capacity region, and the suppressing of the gas generation amount.

Therefore, as a problem in addition to the first problem, the present invention further provides a new spinel-type lithium-manganese-containing complex oxide capable of achieving both the expansion of the high potential capacity region and the suppression of the gas generation. Such a problem is defined as a third problem of the present invention.

SUMMARY OF THE INVENTION

As a solution to the first problem, the present invention proposes a spinel-type lithium-manganese-containing complex oxide, comprising at least Li, Mn, O, and two or more other elements, and having an operating potential of 4.5 V or more with respect to a metal Li reference potential, wherein, with regard to a D50, a mode diameter, and a D10 according to a measurement of a volume-based particle size distribution obtained via measurements by a laser diffraction scattering-type particle size distribution measurement method (referred to as "D50", "mode diameter", and "D10" respectively), a D50 is 0.5 to 9 μm, a value of (|mode diameter−D50|/mode diameter)×100 is 0 to 25%, a value of (|mode diameter−D10|/mode diameter)×100 is 20 to 58%, a ratio of average primary particle diameter/D50, which is calculated from an average primary particle diameter calculated from a SEM (scanning-type electron microscope) image obtained by a SEM (referred to as "SEM image") and the D50 is 0.20 to 0.99, and a primary particle is a polycrystal.

Here, the term, |mode diameter−D50| means an absolute value of (mode diameter−D50), and the term, |mode diameter−D10| means an absolute value of (mode diameter−D10) (the same applies to the case that will be described below).

As a solution to the first problem, the present invention also proposes a spinel-type lithium-manganese-containing complex oxide, comprising at least Li, Mn, O, and two or more other elements, and having an operating potential of 4.5 V or more with respect to a metal Li reference potential, wherein, with regard to a D50, a mode diameter, and a D10, a D50 is 0.5 to 9 μm, a value of (|mode diameter−D50|/mode diameter)×100 is 0 to 25%, a value of (|mode diameter−D10|/mode diameter)×100 is 20 to 58%, a ratio of average primary particle diameter/D50, which is calculated from an average primary particle diameter calculated from a SEM image and the D50 is 0.20 to 0.99, a crystallite size is 80 to 490 nm, and a ratio of crystallite size/average primary particle diameter, which is calculated from the crystallite size and the average primary particle diameter is 0.01 to 0.32.

As a solution to the second problem, the present invention also proposes a spinel-type lithium-manganese-containing complex oxide, comprising at least Li, Mn, O, and two or more other elements, and having an operating potential of 4.5 V or more with respect to a metal Li reference potential, wherein, with regard to a D50, a mode diameter, and a D10 according to a measurement of a volume-based particle size distribution obtained via measurements by a laser diffraction scattering-type particle size distribution measurement method (referred to as "D50", "mode diameter", and "D10" respectively), a D50 is 0.5 to 9 μm, a value of (|mode diameter−D50|/mode diameter)×100 is 0 to 25%, a value of (|mode diameter−D10|/mode diameter)×100 is 20 to 58%, a ratio of average primary particle diameter/D50, which is calculated from an average primary particle diameter calculated from a SEM (scanning-type electron microscope) image obtained by a SEM (referred to as "SEM image") and the D50 is 0.20 to 0.99, and a primary particle is a polycrystal. In addition, the present invention further proposes a positive electrode active material for a lithium secondary battery, having a layer (referred to as "layer A") comprising at least titanium, aluminum, zirconium, or two or more kinds of these on a part of a surface of lithium-manganese complex oxide particles (also referred to as "core particles") operating at a charging voltage in a region exceeding 4.5 V in a metal Li reference potential.

As a solution to the second problem, the present invention also proposes a spinel-type lithium-manganese-containing complex oxide, comprising at least Li, Mn, O, and two or more other elements, and having an operating potential of 4.5 V or more with respect to a metal Li reference potential, wherein, with regard to a D50, a mode diameter, and a D10, a D50 is 0.5 to 9 μm, a value of (|mode diameter−D50|/mode diameter)×100 is 0 to 25%, a value of (|mode diameter−D10|/mode diameter)×100 is 20 to 58%, a ratio of average primary particle diameter/D50, which is calculated from an average primary particle diameter calculated from a SEM image and the D50 is 0.20 to 0.99, a crystallite size is 80 to 490 nm, and a ratio of crystallite size/average primary particle diameter, which is calculated from the crystallite size and the average primary particle diameter is 0.01 to 0.32. In addition, the present invention further proposes a positive electrode active material for a lithium secondary battery, having a layer (referred to as "layer A") comprising at least titanium, aluminum, zirconium, or two or more kinds of these on a part of a surface of lithium-manganese complex oxide particles (also referred to as "core particles") operating at a charging voltage in a region exceeding 4.5 V in a metal Li reference potential.

As a solution to the third problem, the present invention also proposes a spinel-type lithium-manganese-containing complex oxide, comprising at least Li, Mn, O, and two or more other elements, and having an operating potential of 4.5 V or more with respect to a metal Li reference potential, wherein, with regard to a D50, a mode diameter, and a D10 according to a measurement of a volume-based particle size distribution obtained via measurements by a laser diffraction scattering-type particle size distribution measurement method (referred to as "D50", "mode diameter", and "D10" respectively), a D50 is 0.5 to 9 μm, a value of (|mode diameter−D50|/mode diameter)×100 is 0 to 25%, a value of (|mode diameter−D10|/mode diameter)×100 is 20 to 58%, a ratio of average primary particle diameter/D50, which is calculated from an average primary particle diameter calculated from a SEM (scanning-type electron microscope) image obtained by a SEM (referred to as "SEM image") and the D50 is 0.20 to 0.99, a primary particle is a polycrystal, and in an X-ray diffraction pattern measured by a powder X-ray diffractometer (XRD), a peak is present in a range of 14.0 to 16.5° at 2θ.

As a solution to the third problem, the present invention also proposes a spinel-type lithium-manganese-containing complex oxide, comprising at least Li, Mn, O, and two or more other elements, and having an operating potential of 4.5 V or more with respect to a metal Li reference potential, wherein, with regard to a D50, a mode diameter, and a D10, a D50 is 0.5 to 9 μm, a value of (|mode diameter−D50|/mode diameter)×100 is 0 to 25%, a value of (|mode diameter−D10|/mode diameter)×100 is 20 to 58%, a ratio of average primary particle diameter/D50, which is calculated from an average primary particle diameter calculated from a SEM image and the D50 is 0.20 to 0.99, a crystallite size is 80 to 490 nm, a ratio of crystallite size/average primary particle diameter, which is calculated from the crystallite size and the average primary particle diameter is 0.01 to 0.32, and in an X-ray diffraction pattern measured by a powder X-ray diffractometer (XRD), a peak is present in a range of 14.0 to 16.5° at 2θ.

Effect of the Invention

The spinel-type lithium-manganese-containing complex oxide proposed by the present invention has an operating potential of 4.5 V or more with respect to a metal Li reference potential, and yet can enhance the output characteristics and the charge-discharge cycle ability while suppressing the gas generation.

BRIEF DESCRIPTION OF DRAWING

The drawing depicts a volume-based particle size distribution obtained by measuring a spinel-type lithium-manganese-containing complex oxide obtained in Example 2 according to a laser diffraction scattering-type particle size distribution measurement method.

DETAILED DESCRIPTION AND BEST MODE(S) FOR CARRYING OUT THE INVENTION

Next, the present invention will be described based on embodiments to carry out the present invention. However, the present invention is not limited to the embodiments that will be described below.

<Present 5 V-class Spinel>

The spinel-type lithium-manganese-containing complex oxide according to one example of embodiments of the present invention (referred to as "present 5 V-class spinel") is a lithium-manganese-containing complex oxide which is fitted to a crystal structure model of a cubic crystal of a space group Fd-3m (Origin Choice 2), wherein Rwp and S which represent the degree of coincidence of an observed intensity with a calculated intensity are Rwp<10 or S<2.5, and is a 5 V-class spinel having an operating potential of 4.5 V or more with respect to a metal Li reference potential.

At this time, the "having an operating potential of 4.5 V or more with respect to a metal Li reference potential" is meant to include a case in which the present 5 V-class spinel need not only have an operating potential of 4.5 V or more as a plateau region, but also has a part of operating potential of 4.5 V or more.

From this point of view, the present 5 V-class spinel is not limited to a lithium-manganese-containing complex oxide composed only of the "5 V-class lithium-manganese-containing complex oxide" having an operating potential of 4.5 V or more as a plateau region. For example, the present 5 V-class spinel may contain a "4 V-class lithium-manganese-containing complex oxide" having an operating potential of less than 4.5 V as a plateau region. Specifically, the present 5 V-class spinel may occupy 30% by mass or more of the 5 V-class lithium-manganese-containing complex oxide, and allows a lithium-manganese-containing complex oxide occupying preferably 50% by mass or more thereof, and more preferably 80% by mass or more thereof (including 100% by mass).

The present 5 V-class spinel is a spinel-type lithium-manganese-containing complex oxide comprising at least Li, Mn, O, and two or more other elements.

At least one element from the above "two or more other elements" may be an element M1 which is selected from the group consisting of Ni, Co, and Fe, and another element may be an element M2 which is selected from the group consisting of Na, Mg, Al, K, Ca, Ti, V, Cr, Fe, Co, Cu, Ga, Y, Zr, Nb, Mo, In, Ta, W, Re, and Ce.

A preferred composition example of the present 5 V-class spinel may be a composition which contains a spinel-type lithium-manganese-containing complex oxide having a crystal structure in which a part of the Mn sites in $LiMn_2O_{4-\delta}$ are substituted with Li, the metal element M1, and the other metal element M2.

The metal element M1 is a substitution element mainly contributing in exhibiting an operating electric potential of 4.5 V or more with respect to a metal Li reference potential, and examples thereof may include Ni, Co, and Fe. The metal element M1 may contain at least one of these elements, and may also contain other metal elements.

The metal element M2 is a substituent element mainly contributing in stabilizing the crystal structure to enhance the characteristics, and examples of a substituent element that contributes to an increase of the capacity retention rate may include Na, Mg, Al, K, Ca, Ti, V, Cr, Fe, Co, Cu, Ga, Y, Zr, Nb, Mo, In, Ta, W, Re, and Ce. The metal element M2 may contain at least one element selected from the group consisting of Na, Mg, Al, K, Ca, Ti, V, Cr, Fe, Co, Cu, Ga, Y, Zr, Nb, Mo, In, Ta, W, Re, and Ce, and may also contain other metal elements.

Here, the metal element M2 contained in the structure is a different element species from the metal element M1.

An example of the present 5 V-class spinel may be a spinel-type lithium-manganese-containing complex oxide represented by a formula (1): $Li_x(M1_yM2_zMn_{2-x-y-z})O_{4-\delta}$. M1 and M2 in the formula (1) are as described above.

In the above formula (1), the parameter "x" may be 1.00 to 1.20. Among others, the parameter "x" is preferably 1.01 or more or 1.10 or less, and more preferably 1.02 or more or 1.08 or less.

The parameter "y" that represents a content of M1 may be 0.20 to 1.20. Among others, the parameter "y" is preferably 0.30 or more or 1.10 or less, and more preferably 0.35 or more or 1.05 or less.

The parameter "z" that represents a content of M2 may be 0.001 to 0.400. Among others, the parameter "z" is preferably 0.002 or more or 0.400 or less, more preferably 0.005 or more or 0.30 or less, and even more preferably 0.10 or more. In particular, when the parameter "z" is 0.10 or more, the amount of gas generation can be more effectively suppressed.

Meanwhile, the term "4-δ" in each of the above formulae implies that the present 5 V-class spinel may also contain oxygen deficiency. For example, a part of oxygen may be substituted with fluorine or other elements. Here, the parameter "δ" is preferably 0 or more or 0.2 or less, more preferably 0.1 or less, and even more preferably 0.05 or less.

The present 5 V-class spinel may contain other components other than Li, Mn, M1, M2, and O. In particular, the other elements may be contained if at 0.5% by weight or less respectively. This is because if the content is this much amount, it may be considered that the other elements would hardly affect the performance of the present 5 V-class spinel.

An example of the present 5 V-class spinel may be a spinel-type lithium-manganese-containing complex oxide represented by a formula (2): $[Li_x(Ni_yM_zMn_{2-x-z-y-z})O_{4-\delta}]$.

In the above formula (2), the parameter "x" may be 1.00 to 1.20. Among others, the parameter "x" is preferably 1.01 or more or 1.10 or less, and more preferably 1.02 or more or 1.08 or less.

In the above formula (2), the parameter "y" may be 0.20 to 0.70. Among others, the parameter "y" is preferably 0.30 or more or 0.60 or less, and more preferably 0.35 or more or 0.55 or less.

In the above formula (2), M is preferably one element selected from the group consisting of Na, Mg, Al, K, Ca, Ti, V, Cr, Fe, Co, Cu, Ga, Y, Zr, Nb, Mo, In, Ta, W, Re, and Ce, or a combination of two or more elements thereof.

In addition, in the above formula (2), the parameter "z" that represents a molar ratio of M is preferably larger than 0 and 0.5 or less, more preferably larger than 0.01 or 0.45 or less, even more preferably 0.05 or more or 0.40 or less, and still more preferably 0.1 or more or 0.35 or less.

Meanwhile, the term "4-δ" in the above formula (2) implies that the present 5 V-class spinel may also contain oxygen deficiency. For example, a part of oxygen may be substituted with fluorine or other elements. Here, the parameter "δ" is preferably 0 or more or 0.2 or less, more preferably 0.1 or less, and even more preferably 0.05 or less.

The present 5 V-class spinel may contain other components other than Li, Mn, M, M1, M2, and O. In particular, the other elements may be contained if at 0.5% by weight or less respectively. This is because if the content is this much amount, it may be considered that the other elements would hardly affect the performance of the present 5 V-class spinel.

In addition, the present 5 V-class spinel may contain B. In so doing, a complex oxide phase containing Ni, Mn, and B may be contained as a state where B is present, in addition to the spinel crystal phase.

Examples of the complex oxide phase containing Ni, Mn, and B may include a crystal phase of $Ni_5MnO_4(BO_3)_2$.

Whether the crystal phase of $Ni_5MnO_4(BO_3)_2$ is contained can be confirmed by collating a diffraction pattern obtained by X-ray diffraction (XRD) with PDF (Powder Diffraction File) No. "01-079-1029".

It is suspected that the complex oxide containing Ni, Mn, and B presents at the surface of the present 5 V-class spinel particles or at the grain boundaries.

In regard to the content of the complex oxide phase containing Ni, Mn, and B, it is preferable to contain the complex oxide phase such that the content of element B in the present 5 V-class spinel would be 0.02 to 0.80% by mass, more preferably 0.05% by mass or more or 0.60% by mass or less, even more preferably 0.30% by mass or less, and particularly preferably 0.25% by mass or less.

When the content of element B is 0.02% by mass or more, the discharge capacity at a high temperature (for example, 45° C.) can be maintained, and when the content of element B is 0.80% by mass or less, the rate characteristics can be maintained, which is preferable.

(Polycrystalline Substance)

A primary particle of the present 5 V-class spinel is preferably not a single crystalline substance, but a polycrystalline substance.

Here, the term, single crystalline substance means a particle in which the primary particle is constituted by one crystallite, and the term, polycrystalline substance means a particle in which a plurality of crystallites are present in the primary particle.

Whether or not the present 5 V-class spinel is a polycrystalline substance can be judged by confirming whether a ratio of the crystallite size with respect to the primary particle diameter (crystallite size/average primary particle diameter) is nearly 0, specifically within a range of higher than 0 and lower than 1. The ratio which is nearly 0 indicates that a large number of crystallites are contained in the primary particle. However, the invention is not limited to this judging method.

Here, the term "primary particles" as used in the present invention means particles of the smallest unit that are surrounded by grain boundaries when observed with a SEM (scanning electron microscope, for example, a magnification of 500 to 5,000 times).

Further, in regard to the average diameter of the primary particles, the "average diameter of primary particles" can be determined by observing with a SEM (scanning electron microscope, for example, a magnification of 500 to 5,000 times), selecting arbitrary 30 primary particles, calculating the average particle diameter of the selected primary particles using an image analysis software, and averaging the primary particle diameters of the 30 particles.

On the other hand, the term "secondary particles" as used in the present invention means particles in which plural primary particles are aggregated so as to share portions of the outer peripheries (grain boundaries) of the respective particles, and are segregated from other particles.

The D50 value according to the volume-based particle size distribution which can be obtained via measurements by a laser diffraction scattering-type particle size distribution measurement method, has a meaning as a substitute value of the average diameter of particles including these primary particles and secondary particles.

In addition, the term "crystallite" means a largest aggregation which can be regarded as a single crystal, and can be determined by XRD measurement and Rietveld analysis.

(Mode Diameter)

A mode diameter of the present 5 V-class spinel, that is, a mode diameter according to a measurement of a volume-based particle size distribution obtained via measurements by a laser diffraction scattering-type particle size distribution measurement method is preferably 0.4 to 11 µm.

In regard to the present 5 V-class spinel, when the mode diameter is adjusted within the above range, the resistance when Li is diffused in the secondary particles can be decreased, and as a result, the output characteristics can be enhanced.

From such a viewpoint, the mode diameter of the present 5 V-class spinel is preferably 0.4 to 11 µm. Among others, it is more preferably 1 µm or more or 10 µm or less, even more preferably 2 µm or more or 9 µm or less, and still more preferably less than 8 µm.

(D50)

A D50 of the present 5 V-class spinel, that is, a D50 according to a measurement of a volume-based particle size distribution obtained via measurements by a laser diffraction scattering-type particle size distribution measurement method is preferably 0.5 to 9 µm.

In regard to the present 5 V-class spinel, when the D50 is adjusted within the above range, the resistance when Li is diffused in the secondary particles can be decreased, and as a result, the output characteristics can be enhanced.

From such a viewpoint, the D50 of the present 5 V-class spinel is preferably 0.5 to 9 µm. Among others, it is more preferably 0.6 µm or more or 8 µm or less, even more preferably more than 1 µm or less than 8 µm, and still more preferably more than 2 µm or less than 7 µm.

(|Mode Diameter−D50|/Mode Diameter)

In regard to the present 5 V-class spinel, a value of (|mode diameter−D50|/mode diameter)×100 is preferably 0 to 25%.

The case where the value of (|mode diameter−D50|/mode diameter)×100 is 25% or less indicates that the particle size distribution shows a single-peaked pattern, that is, a distribution having no plural peaks, and moreover, a normal distribution or a distribution similar to it.

From such a viewpoint, in regard to the present 5 V-class spinel, the value of (|mode diameter−D50|/mode diameter)×100 is preferably 0 to 25%. Among others, it is more preferably more than 0% or 24% or less, even more preferably 23% or less, and still more preferably more than 1% or 20% or less.

(D10)

A D10 of the present 5 V-class spinel, that is, a D10 according to a measurement of a volume-based particle size distribution obtained via measurements by a laser diffraction scattering-type particle size distribution measurement method is preferably 0.2 to 4.0 µm.

In regard to the present 5 V-class spinel, by adjusting the D10 within the above range, the gas generation can be suppressed.

From such a viewpoint, the D10 of the present 5 V-class spinel is preferably 0.2 to 4.0 µm. Among others, it is more preferably 0.25 µm or more or 4.0 µm or less, and even more preferably 0.3 µm or more or less than 4.0 µm.

(|Mode Diameter−D10|/Mode Diameter)

In regard to the present 5 V-class spinel, a value of (|mode diameter−D10|/mode diameter)×100 is preferably 20 to 58%.

The case where the value of (|mode diameter−D10|/mode diameter)×100 is 20 to 58% indicates that the width of the distribution from the mode diameter of the present 5 V-class spinel to the D10 thereof is narrow.

In addition, by adjusting the value of (|mode diameter−D50|/mode diameter)×100 or the value of (|mode diameter−D10|/mode diameter)×00 to the above range, the particle size distribution becomes a distribution similar to a normal distribution and having a narrow peak. In other words, the sizes of the primary particles and the secondary particles can be uniformized.

This indicates that a ratio of a fine powder region in the whole particle size distribution can be reduced. Since a fine powder affects negatively to the gas generation and the charge-discharge cycle ability, by reducing a ratio occupied by the fine powder, the gas generation and the charge-discharge cycle ability can be improved.

From such a viewpoint, in regard to the present 5 V-class spinel, the value of (|mode diameter−D10|/mode diameter)×100 is preferably 20 to 58%. Among others, it is more preferably 22% or more or 57% or less, even more preferably 25% or more or 56% or less, still more preferably 30% or more or less than 52%, and particularly preferably 35% or more or less than 50%.

(Dmin)

A Dmin of the present 5 V-class spinel, that is, a Dmin according to a measurement of a volume-based particle size distribution obtained via measurements by a laser diffraction scattering-type particle size distribution measurement method is preferably 0.1 to 2.0 µm.

In regard to the present 5 V-class spinel, when the Dmin is within the above range, the gas generation can be suppressed.

From such a viewpoint, the Dmin of the present 5 V-class spinel is preferably 0.1 to 2.0 µm. Among others, it is more preferably 0.15 µm or more or 2.0 µm or less, even more preferably 0.2 µm or more or less than 2.0 µm, and still more preferably more than 0.6 µm.

In order to adjust the particle size distribution of secondary particles of the present 5 V-class spinel as described above, for example, the particles may be calcined and pulverized, and may be subjected to a heat treatment after the pulverization. However, it is not limited to such a method.

(Average Primary Particle Diameter)

An average primary particle diameter of the present 5 V-class spinel, that is, an average primary particle diameter calculated from a SEM image is preferably 0.3 to 6.0 µm.

In regard to the present 5 V-class spinel, by adjusting the primary particle size to the above range, it is possible to achieve both the suppression of gas generation and the enhancement of output characteristics.

From such a viewpoint, the average primary particle diameter of the present 5 V-class spinel is preferably 0.3 to 6.0 µm. Among others, it is more preferably 0.7 µm or more or 5.5 µm or less, even more preferably 1.0 µm or more or 5.0 µm or less, and still more preferably less than 4.5 µm.

(Average Primary Particle Diameter/D50)

In regard to the present 5 V-class spinel, a ratio (average primary particle diameter/D50) of the average primary particle diameter with respect to the D50 is preferably 0.20 to 0.99.

By specifying the ratio of average primary particle diameter/D50 within the above range, the dispersibility of primary particles can be enhanced. Thus, each and every primary particle can be sufficiently brought into contact with an electrolyte solution, compared to the case where secondary particles occupies more than a half of the particle size distribution. Accordingly, a reaction area of Li with the particles is increased, and a resistance on the interface of the primary particles in the secondary particles can be decreased, thereby leading to an improvement of the output characteristics.

From such a viewpoint, the ratio of average primary particle diameter/D50 of the present 5 V-class spinel is preferably 0.20 to 0.99. Among others, it is more preferably 0.21 or more or 0.98 or less, and even more preferably 0.22 or more or 0.97 or less.

In order to adjust the average primary particle diameter of the present 5 V-class spinel as described above, it is preferable to produce the present 5 V-class spinel by adjusting the calcination temperature, or adding a material which enhances the reactivity in calcination such as a boron compound and a fluorine compound, followed by calcining. However, it is not limited to this method.

(Crystallite Size)

In regard to the present 5 V-class spinel, a crystallite size is preferably 80 to 490 nm.

By specifying the crystallite size within the above range, the ion conductivity in the crystallite can be increased, and thus the output can be raised. In addition, polarization can be suppressed by increasing the output, and preventing the discharge capacity from gradually decreasing with the repetition of charging and discharging at high temperature is possible.

From such a viewpoint, the crystallite size of the present 5 V-class spinel is preferably 80 to 490 nm, more preferably 81 nm or more or 350 nm or less, and even more preferably 82 nm or more or 250 nm or less.

Here, the term "crystallite" means a largest aggregation which can be regarded as a single crystal, and can be determined by XRD measurement and Rietveld analysis.

(Crystallite Size/Average Primary Particle Diameter)

In the present 5 V-class spinel, a ratio (crystallite size/average primary particle diameter) of the crystallite size with respect to the average primary particle diameter is preferably 0.01 to 0.32.

As described above, since the present 5 V-class spinel is a polycrystalline substance, the ratio of crystallite size/average primary particle diameter becomes less than 1, and when the ratio is within the above range, the dispersibility of primary particles in the powder becomes good, a contact area between the primary particles and an electrolyte solution is increased, a resistance on the interface of the primary particles in the secondary particles can be decreased, thereby leading to an improvement of the output characteristics.

From such a viewpoint, in the present 5 V-class spinel, the ratio of crystallite size/average primary particle diameter is preferably 0.01 to 0.32. Among others, it is more preferably 0.011 or more or 0.22 or less, and even more preferably 0.012 or more or 0.11 or less.

In regard to the present 5 V-class spinel, in order to adjust the crystallite size to the above range, it is preferable to adjust a calcination temperature, a calcination time, a supporting agent which enhances reactivity, a calcination atmosphere, a raw material species, and the like. However, it is not limited to those methods.

(Strain)

In regard to the present 5 V-class spinel, in an X-ray diffraction pattern measured by a powder X-ray diffractometer (XRD), a value of a strain obtained by a Rietveld analysis is preferably 0.00 to 0.35.

When the strain is small to this extent, the framework of the spinel-type lithium transition metal oxide is sufficiently rigid, and when used as a positive electrode active substance of a lithium secondary battery, the output characteristics and the charge-discharge cycle ability can be further enhanced.

From such a viewpoint, the strain of the present 5 V-class spinel is preferably 0.00 to 0.35. Among others, it is more preferably 0.30 or less, even more preferably 0.25 or less, and still more preferably 0.20 or less.

In order to adjust the strain of the present 5 V-class spinel to the above range, a heat treatment may be performed under preferred conditions. However, it is not limited to those methods.

(Specific Surface Area)

From the viewpoint of reactivity with an electrolyte solution, a specific surface area of the present 5 V-class spinel is preferably 0.4 to 6.0 m$^2$/g. Among others, it is more preferably 0.5 m$^2$/g or more or 5.0 m$^2$/g or less, even more preferably 4.5 m$^2$/g or less, still more preferably 4.0 m$^2$/g or less, and furthermore preferably 2.0 m$^2$/g or less.

(X-ray Diffraction Peak)

In the present 5 V-class spinel, it is more preferable that, in an X-ray diffraction pattern measured by a powder X-ray diffractometer (XRD) using CuKα1 ray, a peak is present in a range of 14.0 to 16.5° at 2θ.

As a result of a number of tests performed by the inventors of the present invention, in regard to the 5 V-class spinel comprising Li, Mn, O and two or more other elements, when a peak is present in a range of 14.0 to 16.5° at 2θ in an X-ray diffraction pattern, it has been confirmed that a shoulder at near 4 V is disappeared, a plateau region at near 4.5 V is expanded, a high potential capacity region is expanded, and thus energy density is increased, compared to the 5 V-class spinel in which the peak is not present in a range of 14.0 to 16.5° at 2θ in an X-ray diffraction pattern.

Meanwhile, in regard to whether or not a peak is present in a range of 14.0 to 16.5° at 2θ, in the XRD pattern, an average value of cps in ranges of 14.0 to 14.5° and 16.0 to 16.5° at 2θ is adopted as an intensity A of a background (BG) and a maximum value of cps in a range of 14.5 to 16.0 is adopted as a peak intensity B, and when the difference (B−A) is 25 cps or more, it can be determined that a peak is present. Since it can be considered that the effect of the present invention can be enjoyed when the difference is larger, the difference is preferably 30 cps or more, more preferably 40 cps or more, and even more preferably 50 cps or more.

Further, in the X-ray diffraction pattern of the present 5 V-class spinel, it is preferable that a ratio of a peak intensity of the peak that is the highest in the peaks present in a range of 14.0 to 16.5° at 2θ with respect to a peak intensity of the peak that is the highest in the peaks present in a range of 18 to 19° at 2θ (P14–16°/P18–19°) is more than 0.05%. Among others, it is more preferably 0.05% or more or 2.0% or less, and even more preferably 0.05% or more or 1.5% or less.

In order to produce the present 5 V-class spinel such that a peak is present in a range of 14.0 to 16.5° at 2θ, it is preferable to perform an oxygen-containing pressure heat treatment (post-pulverizing pressure heat treatment) to a 5 V-class spinel-type lithium-manganese-containing complex oxide as an object to be treated, as described later. However, the method is not limited to such a method.

(Layer A)

It is more preferable that the present 5 V-class spinel has a layer (referred to as "layer A") comprising titanium (Ti), aluminum (Al), zirconium (Zr), or two or more kinds of these on a part of a surface of the present 5 V-class spinel particles (primary particles or secondary particles), that is, lithium-manganese complex oxide particles (also referred to as "core particles").

By having such a layer A, rate characteristics of the present 5 V-class spinel can be further enhanced. By having the layer A, active sites on the active material surface can be decreased, the rate characteristics can be enhanced, and the gas generation can be suppressed.

The layer A may further comprise phosphorus (P).

Examples of the layer A comprising phosphorus (P) may include a layer A comprising Ti and P, a layer A comprising Al and P, a layer A comprising Zr and P, a layer A comprising Ti, Al, and P, a layer A comprising Ti, Zr, and P, a layer A comprising Al, Zr, and P, a layer A comprising Ti, Al, Zr, and P, and the like.

Incidentally, the layer A may comprise other elements other than Ti, Al, Zr, and P.

The layer A may be partially present on the core particle surface so that there may be the part where the layer A is not present.

By providing such a layer A on a part of the surface of the core particles, it is possible to suppress the side reaction between the core particles and the electrolytic solution, and to achieve both the enhancement of rate characteristics and the suppression of gas generation.

In addition, other layers may be interposed between the core particle surface and the layer A.

For example, a layer containing a titanium oxide may be interposed therebetween. Furthermore, other layers may be present on a surface side of the layer A.

From the viewpoints of improving the rate characteristics and enhancing the gas generation suppressing effect, a thickness of the layer A is preferably 0.01 to 200 nm. Among others, it is more preferably 0.1 nm or more or 190 nm or less, and even more preferably 0.1 nm or more or 180 nm or less.

Such a layer A can be formed, for example, through a surface treatment of the core particles. For example, the layer A can be formed by performing a surface treatment using a coupling agent which contains titanium (Ti), aluminum (Al), zirconium (Zr), or two or more kinds of these and then performing a heat treatment at 300° C. or more, preferably higher than 300° C. or 820° C. or less, more preferably higher than 500° C. or 800° C. or less, and even more preferably 600° C. or more or lower than 800° C.

<Method for Producing Present 5 V-class Spinel>

An example of the method for producing the present 5 V-class spinel may be a production method having a raw material mixing step, a wet pulverization step, a granulation step, a calcination step, a heat treatment step, a washing and drying step, and a pulverization step.

However, such a production method is a preferred example, and the present invention is not limited to such a production method.

(Raw Material)

Here, raw materials for producing a spinel-type lithium-manganese-containing complex oxide represented by a formula (1): $[Li_x(M1_yM2_zMn_{2-x-y-z})O_{4-\delta}]$ or a formula (2): $[Li_x(Ni_yM_zMn_{2-x-y-z})O_{4-\delta}]$ will be described. However, since the present 5 V-class spinel, which is the production object of the present invention, is not limited to the substance represented by the above formulae (1) and (2), the raw materials can be appropriately changed.

Examples of the raw materials for producing a spinel-type lithium-manganese-containing complex oxide represented by a formula (1): $[Li_x(M1_yM2_zMn_{2-x-y-z})O_{4-\delta}]$ or a formula (2): $[Li_x(Ni_yM_zMn_{2-x-y-z})O_{4-\delta}]$ may include lithium raw materials, nickel raw materials, manganese raw materials, M metal raw materials, and other raw materials such as boron raw materials.

Examples of the lithium raw materials may include lithium hydroxide (LiOH, LiOH.H$_2$O), lithium carbonate (Li$_2$CO$_3$), lithium nitrate (LiNO$_3$), lithium oxide (Li$_2$O), and besides, fatty acid lithium and lithium halides.

Examples of the manganese raw materials may include manganese carbonate, manganese nitrate, manganese chloride, manganese dioxide, dimanganese trioxide, and trimanganese tetroxide. Among others, manganese carbonate and manganese dioxide are preferable. Among others, electrolytic manganese dioxide that is obtained by an electrolytic method is more preferable.

Examples of the M1 metal raw materials, the M2 metal raw materials, and the M metal raw materials may include carbonate, nitrate, chloride, oxyhydroxide salt, hydroxide, and oxide of M metal.

In addition, a boron compound may be blended into the raw material.

The boron compound may be a compound containing boron (B element), and for example, it is preferable to use boric acid or a lithium borate. As the lithium borate, various forms thereof, for example, lithium metaborate (LiBO$_2$), lithium tetraborate (Li$_2$B$_4$O$_7$), lithium pentaborate (LiBO$_2$) and lithium perborate (Li$_2$B$_2$O$_7$) can be used.

When such boron compound is blended, the complex oxide phase containing Ni, Mn, and B, for example, a crystal phase of Ni$_5$MnO$_4$(BO$_3$)$_2$ may occur, in addition to the crystal phase of the present 5 V-class spinel.

(Raw Material Mixing Step)

The method of mixing the raw materials is not especially limited as long as the raw materials can be uniformly mixed. For example, the respective raw materials may be added simultaneously or in an appropriate order, and may be stirred and mixed in a wet mode or a dry mode, using a known mixing machine such as a mixer, to serve as a raw material mixed powder. When an element that is not easily substitutable, for example, aluminum, is added, it is preferable to employ wet mixing.

As the dry mixing, for example, a mixing method using a precision mixing machine which rotates the raw material mixed powder at a high speed can be exemplified.

On the other hand, as the wet mixing, a method of adding the raw material mixed powder to a liquid medium such as water or a dispersant, and performing wet mixing to obtain slurry, can be cited.

(Wet Pulverization Step)

In the wet pulverization step, the raw material is pulverized by introducing into a liquid medium such as water. The wet pulverization may be performed before mixing the raw materials, or may also be performed after mixing the raw materials.

In the case of performing the wet pulverization after mixing the raw materials, the raw material mixed powder is added to a liquid medium such as water or a dispersant, and is wet mixed to obtain slurry as described above, and then the obtained slurry may be pulverized using a wet-type pulverizer. At this time, it is particularly preferable to pulverize the slurry to submicron order. By granulating and calcining the obtained slurry after pulverizing to submicron order, the uniformity of the respective particles before the calcination reaction can be increased, and the reactivity can be raised.

Meanwhile, in the case of performing the wet pulverization before mixing the raw materials, the respective raw materials may be wet pulverized respectively and mixed. Thereafter, the resultant materials may be further wet pulverized if necessary.

In the case of pulverizing the respective raw materials respectively, in order to enhance the homogeneity in raw material mixing, it is preferable to pulverize a raw material having a large Dmax in advance before the raw materials are mixed. For example, it is preferable that only a nickel compound, or a nickel compound and a manganese compound if necessary are pulverized and classified to adjust such that the maximum particle diameter (Dmax) of the nickel compound and the manganese compound becomes 10 μm or less, more preferably 5 μm or less, and even more preferably 4 μm or less.

(Granulation Step)

It is preferable that the raw materials mixed as described above are calcined after being granulated to a predetermined size, if necessary. However, granulation may not be necessarily performed.

A granulation method may be a wet-type method or a dry-type method as long as various raw materials that are pulverized in the previous step are dispersed in a granulated particle, and may be an extrusion granulation method, a rolling granulation method, a fluidized bed granulation method, a mixing granulation method, a spray drying granulation method, a pressure molding granulation method, or a flake granulation method using a roll or the like. However, in the case of performing the wet-type granulation, sufficient drying before the calcination is needed.

Examples of the drying method may include known drying methods such as a spray thermal drying method, a hot-air drying method, a vacuum drying method, and a freeze-drying method, and among others, the spray thermal drying method is preferable. The spray thermal drying method is preferably performed using a thermal spray drying machine (spray dryer). When the granulation is performed using the thermal spray drying machine (spray dryer), a particle size distribution can be sharper, and a configuration of secondary particles can be prepared so as to include aggregated particles (secondary particles) that are aggregated in a round shape.

(Calcination Step)

The calcination is preferably performed, in a calcining furnace under an air atmosphere, an atmosphere whose oxygen partial pressure is adjusted, a carbon dioxide gas-containing atmosphere, or other atmospheres, so as to maintain a temperature of higher than 750° C. and 1,000° C. or less, preferably 800 to 1,000° C. (:meaning the temperature when a thermocouple is brought into contact with a calcination product in a calcining furnace) for 0.5 to 300 hours. At this time, it is preferable to select calcining conditions in which transition metals are dissolved at an atomic level to form a single phase.

When the primary particle is small, there is a possibility that fine particles that cause gas generation easily occur. Thus, the calcination temperature is preferably higher than 750° C., more preferably 800° C. or more, and even more preferably 840° C. or more.

However, when the calcination temperature is too high, there is a possibility that oxygen deficiency is increased, and the strain cannot be recovered even by the heat treatment. Therefore, it is preferable to calcine at a temperature of 1,000° C. or less, and more preferably 980° C. or less.

Here, the term, calcination temperature means a temperature of a calcined product measured by bringing a thermocouple into contact with the calcined product inside a calcination furnace.

A calcination time, that is, a time for maintaining the calcination temperature, may vary with the calcination temperature, but it may be 0.5 to 100 hours.

The kind of the calcination furnace is not particularly limited. The calcination can be performed using, for example, a rotary kiln, a stationary furnace, or other calcination furnaces.

Meanwhile, in the case of coexisting materials which enhance the reactivity in calcination such as a boron compound and a fluorine compound, a specific surface area can be lowered even at low temperature. In such a case, it is preferable to calcine at a calcination temperature of 750° C. or more, more preferably 800° C. or more, and even more preferably 820° C. or more. However, when the calcination temperature is too high, there is a possibility that oxygen deficiency is increased, and the strain cannot be recovered even by the heat treatment. Therefore, it is preferable to calcine at a temperature of 980° C. or less, and more preferably 960° C. or less.

On the other hand, when the materials which enhance the reactivity in calcination as described above are not coexisted, it is preferable to calcine at a temperature of higher than 800° C., more preferably 820° C. or more, and even more preferably 840° C. or more. However, when the calcination temperature is too high, there is a possibility that oxygen deficiency is increased, and the strain cannot be recovered even by the heat treatment. Therefore, it is preferable to calcine at a temperature of 1,000° C. or less, and more preferably 980° C. or less.

After the calcination, it is preferable to perform a crushing as necessary. By crushing a sintered mass or the like after calcination, oxygen can be easily incorporated into powder, and then it is possible to suppress oxygen deficiency and to decrease strain, in a heat treatment step that will be described later. Incidentally, in the present step, the crushing is preferably performed so as not to crush secondary particles.

(Heat Treatment Step)

The heat treatment is preferably performed under an air atmosphere, an atmosphere whose oxygen partial pressure is adjusted, or other atmospheres, in an environment of 500 to 800° C., preferably 700° C. or more or 800° C. or less for 0.5 to 300 hours so as to easily incorporate oxygen into the crystal structure. At this time, when the temperature is lower than 700° C., the effect of the heat treatment is not easily obtained, and there is a risk that oxygen may not be incorporated. On the other hand, when the heat treatment is performed at a temperature of higher than 800° C., desorption of oxygen begins, and the effect intended by the present invention cannot be obtained.

In the heat treatment, the heat treatment atmosphere may be an atmosphere where the overall pressure of the treatment atmosphere is a pressure which is higher than air pressure (0.1 MPa), for example, more than 0.19 MPa, and more preferably 0.20 MPa or more, as necessary.

However, when the overall pressure of the treatment atmosphere is too high, there is a possibility that the production becomes unstable due to a problem on strength of the pressurized furnace. Therefore, from such a viewpoint, the heat treatment is preferably performed at an atmosphere pressure of 1.5 MPa or less, and more preferably 1.0 MPa or less.

By performing the heat treatment in such a pressuring state, oxygen is more easily incorporated, and thus the oxygen deficiency can be further suppressed.

(Crushing and Classification Step)

After the heat treatment step, it is preferable to crush the substance, if necessary.

In so doing, the crushing is preferably performed to an extent that the secondary particles should not be crushed.

Then, it is preferable to classify the substance after crushing.

(Washing and Drying Step)

In the washing step, it is preferable to bring an object to be treated (also referred to as "treated powder") into contact with a polar solvent, and to wash the powder so as to separate impurities contained in the treated powder.

For example, the treated powder and a polar solvent are mixed and stirred to obtain a slurry, and the slurry thus obtained may be subjected to solid-liquid separation by filtration or the like, so as to eliminate impurities. At this time, the solid-liquid separation may be performed at a subsequent step.

Here, the term, slurry means a state in which the treated powder is dispersed in the polar solvent.

For the polar solvent that is used for washing, water is preferably used.

The water may be tap water, but it is preferable to use ion-exchanged water or pure water that has been passed through a filter or a wet-type magnetic separator.

The pH of water is preferably 4 to 10, and among others, the pH is more preferably 5 or more or 9 or less.

In regard to the liquid temperature at the time of washing, it has been confirmed that if the liquid temperature at the time of washing is low, the battery characteristics become more satisfactory. Therefore, from such a viewpoint, the liquid temperature is preferably 5° C. to 70° C. Among others, it is more preferably 60° C. or less, and even more preferably 45° C. or less. In particular, it is furthermore preferably 40° C. or less. Also, it is particularly preferably 30° C. or less.

The reason why the battery characteristics become more satisfactory when the liquid temperature at the time of washing is low, can be considered that when the liquid temperature is too high, lithium in the lithium manganese-containing complex oxide is ion-exchanged with protons of the ion-exchanged water, thereby lithium is removed, which affects high temperature characteristics.

In regard to the amount of the polar solvent that is brought into contact with the object to be treated (treated powder), it is preferable to adjust the mass ratio of the lithium-manganese-containing complex oxide with respect to the polar solvent (also referred to as "slurry concentration") to 10 to 70 wt %, more preferably 20 wt % or more or 60 wt % or less, and even more preferably 30 wt % or more or 50 wt % or less. When the amount of the polar solvent is 10 wt % or more, impurities such as $SO_4$ are easily eluted, and on the contrary, when the amount of the polar solvent is 60 wt % or less, a washing effect adequate for the amount of the polar solvent can be obtained.

When the object to be treated is washed, it may be introduced into a washing liquid, followed by stirred, left to stand, and then a supernatant may be removed. For example, the spinel-type lithium-manganese-containing complex oxide is introduced into a washing liquid, stirred for 20 minutes, and left to stand for 10 minutes. Thereafter, it is preferable to eliminate the spinel-type lithium-manganese-containing complex oxide contained in the supernatant. By washing as described above, the amount of impurities in the spinel-type lithium-manganese-containing complex oxide, for example, the sulfur content can be decreased.

(Pulverization Step)

In the pulverization step, it is preferable to pulverize using an airflow-type pulverizer, a classification mechanism-equipped collision-type pulverizer, for example, a jet mill, a classifying rotor-equipped counter jet mill, or the like. When the pulverization is performed using a jet mill, an aggregation between the primary particles or a part where the degree of the calcination is weak can be pulverized. However, it is not limited to a jet mill. Pulverizers such as a pin mill and a planetary ball mill can also be used.

An example of the jet mills may be a classifying rotor-equipped counter jet mill. The counter jet mill is known as a pulverizer utilizing a collision of compressed gas flow. Raw materials which are supplied from a raw material hopper to the mill are fluidized by injection air from the nozzle. In so doing, the counter jet mill is placed such that the injection air converges to one point. Thus, the particles accelerated during the jet collide each other, and the particles can be finely pulverized.

A rotation speed of classifier of the counter jet mil is preferably 7,000 rpm or more. Among others, it is more preferably 8,000 rpm or more or 18,000 rpm or less, and even more preferably 9,000 rpm or more or 18,000 rpm or less.

(Post-pulverizing Heat Treatment Step in Oxygen-containing Atmosphere)

After the pulverization step, a heat treatment in oxygen-containing atmosphere may be performed as necessary.

By performing a heat treatment in oxygen-containing atmosphere after the pulverization step, oxygen can be incorporated into the structure, and a strain caused by the pulverization can be further decreased.

In the post-pulverizing heat treatment step in an oxygen-containing atmosphere, it is preferable to perform a heat treatment at a temperature of higher than 500° C. and lower than 850° C. in a treatment atmosphere in which an overall pressure in the treatment atmosphere is air pressure or a pressure higher than air pressure, and an oxygen partial pressure in the atmosphere is higher than an oxygen partial pressure in air pressure.

By performing the heat treatment in an oxygen-containing atmosphere as described above, oxygen is incorporated into the structure of the present 5 V spinel, and thus oxygen deficiency is decreased and the structure is stabilized. Therefore, even in the case of calcining at high temperature or even after pulverizing as described above, the strain in the structure can be eliminated, and the output and cycle characteristics can be improved.

Incidentally, the pressure atmosphere which is higher than air pressure includes a case in which the pressure is higher than air pressure by heating an inside of sealed container such that the pressure is increased by rising a temperature of gas in a certain volume.

Here, in the atmosphere of the pressure higher than air pressure as describe above, it is preferable that the overall pressure of the atmosphere is a pressure which is higher than air pressure (0.1 MPa), for example, more than 0.19 MPa, and more preferably 0.20 MPa or more. However, when the overall pressure of the treatment atmosphere is too high, there is a possibility that the production becomes unstable due to a problem on strength of the pressurized furnace. Therefore, from such a viewpoint, the heat treatment is preferably performed at an atmosphere pressure of 1.5 MPa or less, and more preferably 1.0 MPa or less. As such, by performing the heat treatment in a state of pressuring in an oxygen-containing atmosphere, oxygen is more easily incorporated, and thus the oxygen deficiency can be further suppressed. From such a viewpoint, it is preferable to control the overall pressure in the atmosphere during the pressure heat treatment in an oxygen-containing atmosphere to higher than 0.19 MPa and 1.5 MPa or less, more preferably 0.20 MPa or more or 1.3 MPa or less, and even more preferably 1.0 MPa or less.

Further, in the atmosphere of the pressure higher than air pressure, it is preferable that the oxygen partial pressure is, for example, higher than 0.19 MPa, and more preferably 0.20 MPa or more. However, when the oxygen partial pressure is too high, there is a possibility that the production becomes unstable due to a problem on strength of the pressurized furnace. Therefore, from such a viewpoint, the heat treatment is preferably performed under an oxygen partial pressure of 1.5 MPa or less, and more preferably 1.0 MPa or less.

From such a viewpoint, it is preferable to control the oxygen partial pressure in the post-pulverizing heat treatment step in an oxygen-containing atmosphere to higher than 0.19 MPa and 1.5 MPa or less, more preferably 0.20 MPa or more or 1.3 MPa or less, and even more preferably 1.0 MPa or less.

It is preferable to control a heat treatment temperature in the post-pulverizing heat treatment step in an oxygen-containing atmosphere, that is, a retention temperature to a temperature of higher than 500° C. and lower than 850° C.

When the heat treatment temperature in the present step is higher than 500° C., the heat treatment is performed while forcibly supplying oxygen, and thus the strain can be effectively decreased by incorporating oxygen into the crystal structure. From such a viewpoint, the heat treatment temperature is preferably a temperature of higher than 500° C., more preferably 600° C. or more, even more preferably 700° C. or more, and still more preferably higher than 700° C.

Meanwhile, when the heat treatment temperature is too high, there is a possibility that oxygen deficiency is increased, and the strain cannot be recovered even by the heat treatment. Therefore, the heat treatment temperature is preferably a temperature of lower than 850° C., more preferably 820° C. or less, and even more preferably 800° C. or less.

Incidentally, the term, heat treatment temperature means a product temperature of the treated object which is measured by bringing a thermocouple into contact with the treated object in the furnace.

An example of the preferred conditions in the post-pulverizing heat treatment in an oxygen-containing atmosphere may be a condition in which an overall pressure in the treatment atmosphere is higher than air pressure, an oxygen partial pressure is higher than 0.19 MPa, and the pressure heat treatment in an oxygen-containing atmosphere is performed at a temperature of higher than 500° C. and lower than 850° C., among others, 600° C. or more or lower than 850° C., and still among others, higher than 700° C. or 800° C. or less.

It is preferable that a temperature-rise rate when heating to the heat treatment temperature, that is, the retention temperature is 0.1 to 20° C./min, more preferably 0.25° C./min or more or 10° C./min or less, and even more preferably 0.5° C./min or more or 5° C./min or less.

It is necessary that the retention time of the heat treatment temperature in the post-pulverizing heat treatment step in an oxygen-containing atmosphere is at least one minute or more. In order to incorporate oxygen into the crystal structure sufficiently, it is considered that at least one minute is necessary. From such a viewpoint, the retention time of the heat treatment temperature is preferably 5 minutes or more, and more preferably 10 minutes or more. Further, it is considered that when the retention time is 200 hours or less, an effect in which oxygen is incorporated into the crystal structure is sufficiently obtained.

In regard to a temperature-fall rate after heat treatment, it is preferable to cool slowly at a cooling rate of 10° C./min or less at least to 500° C., and it is more preferable to control the cooling rate of 0.1 to 8° C./min, and even more preferably 0.2 to 5° C./min.

Since it is considered that the oxygen thus incorporated is stabilized at near 500° C., it can be considered that it is preferable to cool slowly at a temperature-fall rate of 10° C./min or less at least to 500° C.

The heat treatment in the post-pulverizing heat treatment step in an oxygen-containing atmosphere as described above can be performed by heating using an apparatus such as a pressurized furnace (pressurizable pressure is 1.0 MPa) at a treatment atmosphere in which an overall pressure in the treatment atmosphere is higher than air pressure, and an oxygen partial pressure in the atmosphere is higher than an oxygen partial pressure in air pressure.

(Crushing and Classification Step)

After the heat treatment step, it is preferable to crush the substance, if necessary.

In so doing, the crushing is preferably performed to an extent that the primary particles should not be disintegrated.

Then, it is preferable to classify the substance after crushing.

(Layer a Forming Step)

The present 5 V-class spinel (powder) obtained as described above is subjected to the surface treatment using a mixture prepared by mixing a surface treatment agent such as a titanium coupling agent, an aluminum coupling agent, a zirconium coupling agent, a titanium-aluminum coupling agent, or an aluminum-zirconium coupling agent with an organic solvent, dried to volatilize the organic solvent, and then subjected to the heat treatment at 300° C. or more, whereby it is possible to form the layer A.

Incidentally, the forming of layer A may be performed after the heat treatment and the crushing step, may be performed after the pulverization step, or may be performed after a water washing step.

The coupling agent may be a compound having an organic functional group and a hydrolyzable group in the molecule, and is preferably those which have phosphorus (P) in the side chain among them. The coupling agent having phosphorus (P) in the side chain exhibits more favorable affinity for the binder and thus exhibits excellent binding property with the binder.

In the case of performing the surface treatment using such a coupling agent, it is necessary to perform drying by heating at, for example, 40 to 120° C., in order to volatilize an organic solvent. Thereafter, it is preferable to heat at 300° C. or more, preferably more than 300° C. or 820° C. or less, more preferably more than 500° C. or 800° C. or less, and even more preferably 600° C. or more or less than 800° C.

By heating the powder at 300° C. or more as described above, it is possible to oxidize the layer A as well as to decrease the content of carbon in the layer A, and it is possible to further enhance the rate characteristics and the charge-discharge cycle ability depending on the kind of coupling agent in some cases.

The heat treatment after drying is preferably performed in an oxygen-containing atmosphere. This is because there is a possibility that oxygen in the active material is also lost at the same time as the organic solvent or the side chain of the coupling agent is removed by the heat treatment after drying, and thus it is preferable to replenish the lost oxygen by performing the heat treatment after drying in an oxygen-containing atmosphere. From such a viewpoint, it is preferable to perform the heat treatment after drying in an air atmosphere or an oxygen atmosphere among the oxygen-containing atmospheres.

Incidentally, the term, oxygen atmosphere means an atmosphere in which the abundance of oxygen is greater than in an air atmosphere.

<Application of Present 5 V-class Spinel>

The present 5 V-class spinel can be effectively used as a positive electrode active material for various lithium batteries after being crushed and classified as necessary.

In the case of using the present 5 V-class spinel as a positive electrode active material for various lithium batteries, a positive electrode mixture can be produced by mixing, for example, the present 5 V-class spinel, a conductive material formed from carbon black or the like, and a binder formed from a TEFLON (registered trademark) binder or the like. Then, a lithium battery can be constituted by using such a positive electrode mixture as a positive electrode, using lithium or a material capable of intercalating and de-intercalating lithium, such as carbon, as a negative electrode, and using a solution in which a lithium salt such as lithium hexafluorophosphate (LiPF6) is dissolved in a mixed solvent such as ethylene carbonate-dimethyl carbonate as a non-aqueous electrolyte.

A lithium battery constituted in this manner can be used, for example, in electronic devices such as laptop computers, mobile phones, cordless telephone handsets, video movies, liquid crystal televisions, electric shavers, portable radios, headphone stereos, backup power supplies, and memory cards, medical devices such as pacemakers and hearing aids, and driving power supplies for being mounted in electric vehicles. Among others, the lithium battery is particularly effective as various kinds of portable computers such as mobile phones, PDAs (portable information terminals), and laptop computers, electric vehicles (including hybrid vehicles), and driving power supplies for electric power storage, which require excellent cycle characteristics.

<Explanation of Words and Phrases>

In the present specification, in the case of being expressed as "X to Y" (X and Y are arbitrary numbers), it includes the meaning of being "preferably greater than X" or "preferably smaller than Y" together with the meaning of being "X or more and Y or less" unless otherwise stated.

In addition, in the case of being expressed as "X or more" (X is an arbitrary number) or "Y or less" (Y is an arbitrary number), it also includes the intention to be "preferably greater than X" or "preferably less than Y".

EXAMPLES

Next, the present invention will be described further based on Examples and Comparative Examples. However, the present invention is not limited to the following Examples.

Example 1

Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 2 μm, and lithium tetraborate having an average particle diameter (D50) of 60 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, the Ti raw material, and the B raw material, and the dispersant was sufficiently dissolved in and mixed with the ion-exchanged water. Then, the Ni and Mn raw materials that had been weighed were added to the ion-exchanged water, in which the dispersant was dissolved in advance, and the resultant mixture was mixed and stirred, followed by pulverized using a wet-type pulverizer at 1,300 rpm for 120 minutes, thereby obtaining a pulverized slurry having an average particle diameter (D50) of 0.60 μm or less. Next, the remaining raw materials were added to the slurry, and the resultant mixture was stirred, followed by pulverized at 1,300 rpm for 120 minutes, thereby obtaining a pulverized slurry having an average particle diameter (D50) of 0.60 μm or less. A solid content concentration at this time was set to 40 wt %.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.46 MPa, a slurry supply amount was set to 340 ml/min, and a temperature was adjusted such that an inlet temperature of a drying tower became 200 to 280° C.

The obtained granulated powder was calcined using a stationary electric furnace under an air atmosphere so as to maintain a temperature of 880° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 750° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 cm$^2$) at a rotation speed of 400 to 550 rpm for 20 minutes. After stirring, the stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant product was dried for 7 hours in a state of being heated so as to have the product temperature of 500° C.

Then, after drying, the resultant dried product was crushed using a counter jet mill (pulverizing and classifying apparatus, manufactured by Hosokawa Micron Corp.) (crushing condition: rotation speed of classifier of 11,000 rpm). Thereafter, the resultant crushed product was classified using a sieve having an aperture of 300 μm, thereby obtaining a spinel-type lithium-manganese-containing complex oxide powder (sample).

Chemical analysis was performed with respect to the spinel-type lithium-manganese-containing complex oxide powder (sample), and as a result, the components were Li: 3.9 wt %, Ni: 14.2 wt %, Mn: 42.6 wt %, Ti: 3.6 wt %, and B: 0.1 wt %. The composition when expressing by a general formula: [Li$_x$ (M1$_y$M2$_z$Mn$_{2-x-y-z}$) O$_{4-\delta}$] is shown in Table 1. M1 represents Ni in the present Example, and M2 is a substitution element species and represents Ti in the present Example (the same applies to the following Examples and Comparative Examples).

Here, temperatures in the calcination and in the heat treatment are product temperatures of the treated object which are measured by bringing a thermocouple into contact with the treated object in the furnace.

The same applies to Examples and Comparative Examples that will be described later.

Example 2

The spinel-type lithium-manganese-containing complex oxide powder thus obtained by crushing and classifying with a counter jet mill in Example 1 was subjected to a heat treatment (second heat treatment) while flowing oxygen at an oxygen supply amount of 0.5 L/Min in a tubular-type stationary furnace so as to maintain a furnace set temperature of 725° C. for 5 hours.

The powder obtained after the second heat treatment was classified using a sieve having an aperture of 300 μm, and the powder under the sieve was collected to obtain a spinel-type lithium-manganese-containing complex oxide powder (sample).

Example 3

The following surface treatment was performed with respect to the spinel-type lithium-manganese-containing complex oxide powder thus obtained by crushing and classifying with a counter jet mill in Example 1. That is, 100 parts by mass of the spinel-type lithium-manganese-containing complex oxide powder, 3.0 parts by mass of a zirconium coupling agent (Ken-React (registered trademark) NZ12, manufactured by Kenrich Petrochemicals, Inc.) as a surface treatment agent, and 7.6 parts by mass of isopropyl alcohol as a solvent were mixed using a cutter mill (Millser 720G, manufactured by Iwatani Corp.). Next, the spinel-type lithium-manganese-containing complex oxide powder thus mixed was placed in a dryer, and was then dried under the conditions of 100° C. and 1 hour in a vacuum atmosphere to obtain a spinel-type lithium-manganese-containing complex oxide powder.

The spinel-type lithium-manganese-containing complex oxide powder thus obtained was subjected to the second heat treatment in the same manner as in Example 2, and thereafter, a spinel-type lithium-manganese-containing complex oxide powder (sample) was obtained in the same manner as in Example 2.

With respect to the spinel-type lithium-manganese-containing complex oxide powder thus obtained, a cross-section in the vicinity of a particle surface was observed with a transmission electron microscope ("JEM-ARM200F", manufactured by JEOL Ltd.). From the observation, it could be seen that a layer (referred to as "layer A") was partially present on a surface of a core portion that was constituted by a spinel-type lithium-manganese-containing complex oxide. In addition, from analysis performed with EDS with respect to the layer A, it could be seen that the layer A contained zirconium (Zr) and phosphorus (P). In addition, the thickness of the layer A was different depending on the location. The thickness of the thin part was 0.1 nm, and the thickness of the thick part was 30 nm.

Example 4

A spinel-type lithium-manganese-containing complex oxide powder (sample) was obtained in the same manner as in Example 3 except that the raw material composition was changed to the composition shown in Table 1, the B raw material was not used, and the rotation speed of the counter jet mill classifier was changed to 13,000 rpm.

With respect to the spinel-type lithium-manganese-containing complex oxide powder (sample) thus obtained, a cross-section in the vicinity of a particle surface was observed with a transmission electron microscope ("JEM-ARM200F", manufactured by JEOL Ltd.). From the observation, it could be seen that a layer (referred to as "layer A") was partially present on a surface of a core portion that was constituted by a spinel-type lithium-manganese-containing complex oxide. In addition, from analysis performed with EDS with respect to the layer A, it could be seen that the layer A contained zirconium (Zr) and phosphorus (P). In addition, the thickness of the layer A was different depending on the location. The thickness of the thin part was 0.1 nm, and the thickness of the thick part was 30 nm.

Example 5

Instead of performing the second heat treatment in Example 2, a pressure heat treatment in an oxygen-containing atmosphere was performed using a pressurized furnace (manufactured by Hirochiku Co., Ltd.) as follows.

That is, 200 g of the spinel-type lithium-manganese-containing complex oxide powder thus obtained by crushing and classifying with a counter jet mill in Example 1 was filled in a ceramic crucible, and the ceramic crucible was placed inside the pressurized furnace. Thereafter, oxygen gas (oxygen concentration of 99%) was flowed into the pressurized furnace to adjust an oxygen partial pressure to 0.20 MPa and an overall pressure of the treatment atmosphere to 0.21 MPa, and then the ceramic crucible was heated at a temperature-rise rate of 1.7° C./min up to 730° C. and maintained for 15 hours, and thereafter cooled at a temperature-fall rate of 0.3° C./min down to room temperature while continuing oxygen inflow, thereby obtaining a powder. The powder thus obtained was classified using a sieve having an aperture of 300 μm, and the powder under the sieve was collected to obtain a spinel-type lithium-manganese-containing complex oxide powder (sample).

Example 6

The following surface treatment was performed with respect to the spinel-type lithium-manganese-containing complex oxide powder thus obtained by crushing and classifying with a counter jet mill in Example 1.

That is, 100 parts by mass of the spinel-type lithium-manganese-containing complex oxide powder, 3.0 parts by mass of an aluminum coupling agent (PLENACT (registered trademark) AL-M from Ajinomoto Fine-Techno Co., Inc.) as a surface treatment agent, and 7.6 parts by mass of isopropyl alcohol as a solvent were mixed using a cutter mill (Millser 720G, manufactured by Iwatani Corp.). Next, the spinel-type lithium-manganese-containing complex oxide powder thus mixed was placed in a dryer, and was then dried under the conditions of 100° C. and 1 hour in a vacuum atmosphere. Thereafter, the resultant product was heated so as to maintain a state where the product temperature was to be 500° C. for 5 hours, thereby obtaining a spinel-type lithium-manganese-containing complex oxide powder.

The spinel-type lithium-manganese-containing complex oxide powder thus obtained was subjected to the pressure heat treatment in an oxygen-containing atmosphere in the same manner as in Example 5. Thereafter, the powder thus obtained was classified using a sieve having an aperture of 300 μm, and the powder under the sieve was collected to obtain a spinel-type lithium-manganese-containing complex oxide powder (sample).

With respect to the spinel-type lithium-manganese-containing complex oxide powder (sample) thus obtained, a cross-section in the vicinity of a particle surface was observed with a transmission electron microscope ("JEM-ARM200F", manufactured by JEOL Ltd.). From the observation, it could be seen that a layer (referred to as "layer A") was partially present on a surface of a core portion that was constituted by a spinel-type lithium-manganese-containing complex oxide. In addition, from analysis performed with EDS with respect to the layer A, it could be seen that the layer A contained aluminum (Al) and phosphorus (P). In addition, the thickness of the layer A was different depending on the location. The thickness of the thin part was 0.1 nm, and the thickness of the thick part was 30 nm.

Example 7

Lithium carbonate having an average particle diameter (D50) of 7 μm, nickel hydroxide having an average particle diameter (D50) of 22 μm, electrolytic manganese dioxide having an average particle diameter (D50) of 23 μm and a specific surface area of 40 $m^2/g$, titanium oxide having an average particle diameter (D50) of 2 μm, aluminum hydroxide having an average particle diameter (D50) of 2 μm, cobalt oxyhydroxide having an average particle diameter (D50) of 12 μm, and lithium tetraborate having an average particle diameter (D50) of 60 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, the Ti raw material, the Al raw material, the Co raw material, and the B raw material, and the dispersant was sufficiently dissolved in and mixed with the ion-exchanged water. Then, the raw materials that had been weighed were added to the ion-exchanged water, in which the dispersant was dissolved in advance, and the resultant mixture was mixed and stirred to prepare a slurry having a solid content concentration of 40 wt %. Subsequently, the slurry was pulverized using a wet-type pulverizer at 1,300 rpm for 60 minutes, thereby obtaining a pulverized slurry having an average particle diameter (D50) of 0.51 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.46 MPa, a slurry supply amount was set to 316 ml/min, and a temperature was adjusted such that an outlet temperature of a drying tower became 100 to 110° C.

The obtained granulated powder was calcined using a stationary electric furnace under an air atmosphere so as to maintain a temperature of 880° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 740° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 $cm^2$) at a rotation speed of 400 to 550 rpm for 20 minutes. After stirring, the stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant product was dried for 7 hours in a state of being heated so as to have the product temperature of 500° C.

Then, after drying, the resultant dried product was crushed using a counter jet mill (pulverizing and classifying apparatus, manufactured by Hosokawa Micron Corp.) (crushing condition: rotation speed of classifier of 14,900 rpm). Thereafter, the spinel-type lithium-manganese-containing complex oxide powder thus obtained was subjected to a heat treatment (second heat treatment) so as to maintain a temperature of 730° C. in a stationary furnace under an oxygen atmosphere for 5 hours. The powder obtained after the second heat treatment was classified using a sieve having an aperture of 300 μm, and the powder under the sieve was collected to obtain a spinel-type lithium-manganese-containing complex oxide powder (sample).

Chemical analysis was performed with respect to the spinel-type lithium-manganese-containing complex oxide powder (sample) thus obtained, and as a result, the components were Li: 4.0 wt %, Ni: 14.3 wt %, Mn: 43.8 wt %, Ti: 2.5 wt %, Al: 0.7 wt %, and B: 0.1 wt %. The composition when expressing by a general formula: $[Li_x(M1_yM2_z Mn_{2-x-y-xz})O_{4-\delta}]$ is shown in Table 1. M1 represents Ni in the present Example, and M2 is a substitution element species and represents Ti, Al, and Co in the present Example.

Example 8

Lithium carbonate having an average particle diameter (D50) of 7 μm, nickel hydroxide having an average particle diameter (D50) of 22 μm, electrolytic manganese dioxide having an average particle diameter (D050) of 23 μm and a specific surface area of 40 $m^2/g$, titanium oxide having an average particle diameter (D50) of 2 μm, aluminum hydroxide having an average particle diameter (D50) of 2 μm, and lithium tetraborate having an average particle diameter (D50) of 60 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, the Ti raw material, the Al raw material, and the B raw material, and the dispersant was sufficiently dissolved in and mixed with the ion-exchanged water. Then, the raw materials that had been weighed were added to the ion-exchanged water, in which the dispersant was dissolved in advance, and the resultant mixture was mixed and stirred to prepare a slurry having a solid content concentration of 40 wt %. Subsequently, the slurry was pulverized using a wet-type pulverizer at 1,300 rpm for 60 minutes, thereby obtaining a pulverized slurry having an average particle diameter (D50) of 0.53 µm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.44 MPa, a slurry supply amount was set to 320 ml/min, and a temperature was adjusted such that an outlet temperature of a drying tower became 100 to 110° C.

The obtained granulated powder was calcined using a stationary electric furnace under an air atmosphere so as to maintain a temperature of 880° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 740° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 cm$^2$) at a rotation speed of 400 to 550 rpm for 20 minutes. After stirring, the stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant product was dried for 7 hours in a state of being heated so as to have the product temperature of 500° C.

Then, after drying, the resultant dried product was crushed using a counter jet mill (pulverizing and classifying apparatus, manufactured by Hosokawa Micron Corp.) (crushing condition: rotation speed of classifier of 14,900 rpm). Thereafter, the spinel-type lithium-manganese-containing complex oxide powder thus obtained was subjected to a heat treatment (second heat treatment) so as to maintain a temperature of 730° C. in a stationary furnace under an oxygen atmosphere for 5 hours. The powder obtained after the second heat treatment was classified using a sieve having an aperture of 300 µm, and the powder under the sieve was collected to obtain a spinel-type lithium-manganese-containing complex oxide powder (sample).

Chemical analysis was performed with respect to the spinel-type lithium-manganese-containing complex oxide powder (sample) thus obtained, and as a result, the components were Li: 4.1 wt %, Ni: 13.5 wt %, Mn: 44.9 wt %, Ti: 2.6 wt %, Al: 0.7 wt %, and B: 0.1 wt %. The composition when expressing by a general formula: $[Li_x(M1_yM2_z Mn_{2-x-y-z})O_{4-\delta}]$ is shown in Table 1. M1 represents Ni in the present Example, and M2 is a substitution element species and represents Ti and Al in the present Example.

Example 9

Lithium carbonate having an average particle diameter (D50) of 7 µm, nickel hydroxide having an average particle diameter (D50) of 22 µm, electrolytic manganese dioxide having an average particle diameter (D50) of 23 µm and a specific surface area of 40 m$^2$/g, titanium oxide having an average particle diameter (D50) of 2 µm, and lithium tetraborate having an average particle diameter (D50) of 60 µm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to the total amount of the Li raw material, the Ni raw material, the Mn raw material, the Ti raw material, and the B raw material, and the dispersant was sufficiently dissolved in and mixed with the ion-exchanged water. Then, the raw materials that had been weighed were added to the ion-exchanged water, in which the dispersant was dissolved in advance, and the resultant mixture was mixed and stirred to prepare a slurry having a solid content concentration of 40 wt %. Subsequently, the slurry was pulverized using a wet-type pulverizer at 1,300 rpm for 60 minutes, thereby obtaining a pulverized slurry having an average particle diameter (D50) of 0.53 µm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.45 MPa, a slurry supply amount was set to 310 ml/min, and a temperature was adjusted such that an outlet temperature of a drying tower became 100 to 110° C.

The obtained granulated powder was calcined using a stationary electric furnace under an air atmosphere so as to maintain a temperature of 880° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 740° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 cm$^2$) at a rotation speed of 400 to 550 rpm for 20 minutes. After stirring, the stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant product was dried for 7 hours in a state of being heated so as to have the product temperature of 500° C.

Then, after drying, the resultant dried product was crushed using a counter jet mill (pulverizing and classifying apparatus, manufactured by Hosokawa Micron Corp.) (crushing condition: rotation speed of classifier of 14,900 rpm). Thereafter, the spinel-type lithium-manganese-containing complex oxide powder thus obtained was subjected to a heat treatment (second heat treatment) so as to maintain a temperature of 730° C. in a stationary furnace under an oxygen atmosphere for 5 hours. The powder obtained after the second heat treatment was classified using a sieve having an aperture of 300 μm, and the powder under the sieve was collected to obtain a spinel-type lithium-manganese-containing complex oxide powder (sample).

Chemical analysis was performed with respect to the spinel-type lithium-manganese-containing complex oxide powder (sample) thus obtained, and as a result, the components were Li: 4.0 wt %, Ni: 15.3 wt %, Mn: 42.3 wt %, Ti: 3.8 wt %, and B: 0.1 wt %. The composition when expressing by a general formula: $[Li_x(M1_yM2_zMn_{2-x-y-z})O_{4-\delta}]$ is shown in Table 1. M1 represents Ni in the present Example, and M2 is a substitution element species and represents Ti in the present Example.

Example 10

Lithium carbonate having an average particle diameter (D50) of 7 μm, nickel hydroxide having an average particle diameter (D50) of 22 μm, electrolytic manganese dioxide having an average particle diameter (D50) of 23 μm and a specific surface area of 40 $m^2/g$, titanium oxide having an average particle diameter (D50) of 2 μm, and aluminum hydroxide having an average particle diameter (D50) of 2 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, the Mn raw material, the Ti raw material, and the Al raw material, and the dispersant was sufficiently dissolved in and mixed with the ion-exchanged water. Among the raw materials that had been weighed, only the Ni raw material, the Mn raw material, and the Al raw material were added to the ion-exchanged water, in which the dispersant was dissolved in advance, and the resultant mixture was mixed and stirred to obtain a slurry. The obtained slurry was pulverized using a wet-type pulverizer at 1,300 rpm for 120 minutes. Subsequently, the Li raw material and the Ti raw material were added thereto, and the resultant mixture was mixed and stirred to prepare a slurry having a solid content concentration of 40 wt %. Further, the slurry was pulverized using a wet-type pulverizer at 1,300 rpm for 120 minutes, thereby obtaining a pulverized slurry having an average particle diameter (D50) of 0.44 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.43 MPa, a slurry supply amount was set to 320 ml/min, and a temperature was adjusted such that an outlet temperature of a drying tower became 100 to 110° C.

The obtained granulated powder was calcined using a stationary electric furnace under an air atmosphere so as to maintain a temperature of 880° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 740° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 $cm^2$) at a rotation speed of 400 to 550 rpm for 20 minutes. After stirring, the stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant product was dried for 7 hours in a state of being heated so as to have the product temperature of 500° C.

Then, after drying, the resultant dried product was crushed using a counter jet mill (pulverizing and classifying apparatus, manufactured by Hosokawa Micron Corp.) (crushing condition: rotation speed of classifier of 14,900 rpm). Thereafter, the spinel-type lithium-manganese-containing complex oxide powder thus obtained was subjected to a heat treatment (second heat treatment) so as to maintain a temperature of 730° C. in a stationary furnace under an oxygen atmosphere for 5 hours. The powder obtained after the second heat treatment was classified using a sieve having an aperture of 300 μm, and the powder under the sieve was collected to obtain a spinel-type lithium-manganese-containing complex oxide powder (sample).

Chemical analysis was performed with respect to the spinel-type lithium-manganese-containing complex oxide powder (sample) thus obtained, and as a result, the components were Li: 4.0 wt %, Ni: 14.7 wt %, Mn: 42.5 wt %, Ti: 3.5 wt %, and Al: 1.0 wt %. The composition when expressing by a general formula: $[Li_x(M1_yM2_zMn_{2-x-y-z})O_{4-\delta}]$ is shown in Table 1. M1 represents Ni in the present Example, and M2 is a substitution element species and represents Ti and Al in the present Example.

Example 11

Lithium carbonate having an average particle diameter (D50) of 7 μm, nickel hydroxide having an average particle diameter (D50) of 22 μm, electrolytic manganese dioxide having an average particle diameter (D50) of 23 μm and a specific surface area of 40 $m^2/g$, titanium oxide having an average particle diameter (D50) of 2 μm, and aluminum hydroxide having an average particle diameter (D50) of 2 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, the Mn raw material, the Ti raw material, and the Al raw material, and the dispersant was sufficiently dissolved in and mixed with the ion-exchanged water. Among the raw materials that had been weighed, only the Ni raw material, the Mn raw material, and the Al raw material were added to the ion-exchanged water, in which the dispersant was dissolved in advance, and the resultant mixture was mixed and stirred to obtain a slurry. The obtained slurry was pulverized using a wet-type pulverizer at 1,300 rpm for 120 minutes. Subsequently, the Li raw material and the Ti raw material were added thereto, and the resultant mixture was mixed and stirred to prepare a slurry having a solid content concentration of 40 wt %. Further, the slurry was pulverized using a wet-type pulverizer at 1,300 rpm for 120 minutes, thereby obtaining a pulverized slurry having an average particle diameter (D50) of 0.44 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.46 MPa, a slurry supply amount was set to 310 ml/min, and a temperature was adjusted such that an outlet temperature of a drying tower became 100 to 110° C.

The obtained granulated powder was calcined using a stationary electric furnace under an air atmosphere so as to maintain a temperature of 880° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 740° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 cm$^2$) at a rotation speed of 400 to 550 rpm for 20 minutes. After stirring, the stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant product was dried for 7 hours in a state of being heated so as to have the product temperature of 500° C.

Then, after drying, the resultant dried product was crushed using a counter jet mill (pulverizing and classifying apparatus, manufactured by Hosokawa Micron Corp.) (crushing condition: rotation speed of classifier of 14,900 rpm). Thereafter, the spinel-type lithium-manganese-containing complex oxide powder thus obtained was subjected to a heat treatment (second heat treatment) so as to maintain a temperature of 720° C. in a stationary furnace under an oxygen atmosphere for 5 hours. The powder obtained after the second heat treatment was classified using a sieve having an aperture of 300 μm, and the powder under the sieve was collected to obtain a spinel-type lithium-manganese-containing complex oxide powder (sample).

Chemical analysis was performed with respect to the spinel-type lithium-manganese-containing complex oxide powder (sample) thus obtained, and as a result, the components were Li: 4.1 wt %, Ni: 14.7 wt %, Mn: 42.2 wt %, Ti: 3.1 wt %, and Al: 1.3 wt %. The composition when expressing by a general formula: $[Li_x(M1_yM2_zMn_{2-x-y-z})O_{4-\delta}]$ is shown in Table 1. M1 represents Ni in the present Example, and M2 is a substitution element species and represents Ti and Al in the present Example.

Example 12

Lithium carbonate having an average particle diameter (D50) of 7 μm, nickel hydroxide having an average particle diameter (D50) of 22 μm, electrolytic manganese dioxide having an average particle diameter (D50) of 23 μm and a specific surface area of 40 m$^2$/g, titanium oxide having an average particle diameter (D50) of 2 μm, and aluminum hydroxide having an average particle diameter (D50) of 2 μm were weighed respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, the Mn raw material, the Ti raw material, and the Al raw material, and the dispersant was sufficiently dissolved in and mixed with the ion-exchanged water. Among the raw materials that had been weighed, only the Ni raw material, the Mn raw material, and the Al raw material were added to the ion-exchanged water, in which the dispersant was dissolved in advance, and the resultant mixture was mixed and stirred to obtain a slurry. The obtained slurry was pulverized using a wet-type pulverizer at 1,300 rpm for 120 minutes. Subsequently, the Li raw material and the Ti raw material were added thereto, and the resultant mixture was mixed and stirred to prepare a slurry having a solid content concentration of 40 wt %. Further, the slurry was pulverized using a wet-type pulverizer at 1,300 rpm for 120 minutes, thereby obtaining a pulverized slurry having an average particle diameter (D50) of 0.43 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.45 MPa, a slurry supply amount was set to 320 ml/min, and a temperature was adjusted such that an outlet temperature of a drying tower became 100 to 110° C.

The obtained granulated powder was calcined using a stationary electric furnace under an air atmosphere so as to maintain a temperature of 870° C. for 37 hours, and was then crushed using a crusher (Orient vertical-type pulverizing machine, manufactured by Orient Pulverizing Machine Co., Ltd.).

After the crushing, the crushed powder was subjected to a heat treatment (first heat treatment) using a stationary electric furnace under an air atmosphere so as to maintain a temperature of 740° C. for 37 hours, and was then crushed using a crusher (Orient vertical-type pulverizing machine, manufactured by Orient Pulverizing Machine Co., Ltd.).

After the crushing, the crushed powder was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 cm$^2$) at a rotation speed of 400 to 550 rpm for 20 minutes. After stirring, the stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant product was dried for 7 hours in a state of being heated so as to have the product temperature of 500° C.

Then, after drying, the resultant dried product was crushed using a counter jet mill (pulverizing and classifying apparatus, manufactured by Hosokawa Micron Corp.) (crushing condition: rotation speed of classifier of 14,900 rpm). Thereafter, the spinel-type lithium-manganese-containing complex oxide powder thus obtained was subjected to a heat treatment (second heat treatment) so as to maintain a temperature of 730° C. in a stationary furnace under an oxygen atmosphere for 5 hours. The powder obtained after the second heat treatment was classified using a sieve having an aperture of 300 μm, and the powder under the sieve was collected to obtain a spinel-type lithium-manganese-containing complex oxide powder (sample).

Chemical analysis was performed with respect to the spinel-type lithium-manganese-containing complex oxide powder (sample) thus obtained, and as a result, the components were Li: 4.1 wt %, Ni: 14.7 wt %, Mn: 42.1 wt %, Ti: 2.8 wt %, and Al: 1.4 wt %. The composition when expressing by a general formula: $[Li_x(M1_yM2_zMn_{2-x-y-z})O_{4-\delta}]$ is shown in Table 1. M1 represents Ni in the present Example, and M2 is a substitution element species and represents Ti and Al in the present Example.

Comparative Example 1

After performing the heat treatment (first heat treatment) and crushing in Example 1, the crushed powder was further pulverized using a pin mill (Exceed Mill, manufactured by Makino Manufacturing Co. Ltd.). The powder thus obtained was introduced into a plastic beaker (capacity of 5,000 mL) which was filled with 2,000 mL of ion-exchanged water having a pH of 6 to 7 and a temperature of 25° C., and the content was stirred using a stirrer (propeller area of 33 cm$^2$) at a rotation speed of 400 to 550 rpm for 20 minutes. After stirring, the stirring was stopped, the stirrer was taken out from the water, and the resultant stirred sample was left to stand for 10 minutes. Then, the supernatant was removed by decantation, the residual was recovered as a precipitate using a suction filtration machine (filter paper No. 131), and the precipitate thus recovered was dried in an environment of 120° C. for 12 hours. Thereafter, the resultant product was dried for 7 hours in a state of being heated so as to have the product temperature of 500° C. After drying, the dried powder was classified with a sieve having an aperture of 53 μm, thereby obtaining a spinel-type lithium-manganese-containing complex oxide powder (sample).

Comparative Example 2

In Example 1, the B raw material was not used, the calcination temperature was changed to 740° C., and the crushed powder was then calcined. Thereafter, the calcined powder was crushed using a crusher (Orient vertical-type pulverizing machine, manufactured by Orient Pulverizing Machine Co., Ltd.), and was classified with a sieve having an aperture of 53 μm, thereby obtaining a spinel-type lithium-manganese-containing complex oxide powder (sample).

<Method for Measuring Various Physical Property Values>

Various physical property values of the spinel-type lithium-manganese-containing complex oxide powders (samples) obtained in Examples and Comparative Examples were measured as follows.

(Chemical Analysis)

For each of the spinel-type lithium-manganese-containing complex oxide powders (samples) obtained in Examples and Comparative Examples, the content of the respective elements was measured by inductively coupled plasma (ICP) emission spectroscopy. The sulfur content thereof was also measured in the same manner as the above.

(Mode Diameter, D50, D10, and Dmin)

For each of the spinel-type lithium-manganese-containing complex oxide powders (samples) obtained in Examples and Comparative Examples, the sample (powder) was introduced into a watersoluble solvent using an automatic sample feeder for laser diffraction particle diameter distribution measuring apparatus ("Microtorac SDC", manufactured by Nikkiso Co., Ltd.), and the sample was irradiated with ultrasonic waves of 40 W for 360 seconds at a flow rate of 40% more than once. Subsequently, the particle size distribution was measured using a laser diffraction particle size distribution measuring apparatus "MT3000II" manufactured by Nikkiso Co., Ltd., and values of mode diameter, D50, D10, and Dmin were measured from a chart of the volume-based particle size distribution thus obtained.

The number of irradiation times of ultrasonic waves was a number of times until a change rate of D50 before and after the ultrasonic waves irradiation became 8% or less.

Meanwhile, at the time of measurement, the watersoluble solvent was filtered through a filter having a pore size of 60 μm, and the average value obtained by making two measurements under the conditions of a solvent refractive index of 1.33, penetration for the particle penetrability conditions, a particle refractive index of 2.46, a non-spherical shape, a measurement range of 0.133 to 704.0 μm, and a measurement time of 30 seconds, was defined as respective values.

<Primary Particle Diameter>

A primary particle diameter of each of the spinel-type lithium-manganese-containing complex oxide powders (samples) obtained in Examples and Comparative Examples was measured as follows.

The sample (powder) was observed using a SEM (scanning electron microscope) at a magnification of 1,000 times, and particles having a size corresponding to D50 were selected. Next, the sample (powder) was photographed by changing a magnification from 2,000 to 10,000 times in accordance with D50. An image which is suitable for obtaining average primary particle diameter by using an image analysis software which will be described later can be photographed by setting a photographing magnification to, for example, 10,000 times when the D50 is about 7 μm, 5,000 times when the D50 is about 15 μm, and 2,000 times when the D50 is about 22 μm.

For the photographed image, average primary particle diameter of the selected particles was obtained using an image analysis software (MAC-VIEW ver. 4, manufactured by Mountech Co., Ltd.). Here, the term, average primary particle diameter means a 50% accumulated particle diameter in a volume distribution (Heywood diameter: equivalent circle diameter).

In addition, to calculate the average primary particle diameter, it is preferable to measure 30 pieces or more of the primary particles. When the number of the measurement particles was insufficient, the measurement was performed by additionally selecting the particles having a size equivalent to D50 and photographing so that the number of the primary particles became 30 pieces or more in total.

(Identification of Crystal Structure and Lattice Constant)

The XRD measurement was performed under the following measurement condition 1 using an XRD measurement apparatus (apparatus name "Ultima IV", manufactured by Rigaku Corp.) to obtain an XRD pattern. In regard to the obtained XRD pattern, a crystal phase information was determined using an integrated X-ray powder diffraction software PDXL (manufactured by Rigaku Corp.), and was refined by a WPPF (whole powder pattern fitting) method to obtain a lattice constant.

Here, on the assumption that the crystal phase information is attributed to a cubic crystal of a space group Fd-3m (Origin Choice 2), and the 8a site is occupied by Li, the 16d site is occupied by Mn, M1 element, M2 element, and an excessive Li content a, and the 32e site is occupied by O, a seat occupancy and an atomic displacement parameter B on each site were fixed to 1, and the calculation was repeatedly performed until Rwp and S which represent the degree of coincidence of an observed intensity with a calculated intensity converged.

The observed intensity and the calculated intensity are sufficiently coincident, which means that the obtained sample is not limited to the space group, and there is a high reliability for the obtained sample to have a spinel-type crystal structure.

=XRD measurement condition 1=

X-ray source: CuKα (line focus), wavelength: 1.541836 Å

Operation axis: 2θ/θ, measurement method: continuous, counting unit: cps

Initiation angle: 15.0°, termination angle: 120.0°, number of integration times: 1 time Sampling width: 0.01°, scanning speed: 1.0°/min Voltage: 40 kV, current: 40 mA Divergence slit: 0.2 mm, divergence vertical restriction slit: 2 mm Scattering slit: 2°, light-receiving slit: 0.15 mm Offset angle: 0°

Goniometer radius: 285 mm, optical system: focusing method

Attachment: ASC-48

Slit: slit for D/teX Ultra

Detector: D/teX Ultra

Incident-monochro: CBO

Ni-Kβ filter: None

Speed of revolution: 50 rpm (Confirmation of presence or absence of peak in a range of 14.0 to 16.5° at 2θ)

The XRD measurement was performed under the following measurement condition 2 using an XRD measurement apparatus (apparatus name "Ultima IV", manufactured by Rigaku Corp.) to obtain an XRD pattern.

=XRD measurement condition 2=

X-ray source: CuKα (line focus), wavelength: 1.541836 Å

Operation axis: 2θ/θ, measurement method: continuous, counting unit: cps

Initiation angle: 14.0°, termination angle: 16.5°, number of integration times: 15 times Sampling width: 0.01°, scanning speed: 0.1°/min Voltage: 40 kV, current: 40 mA Divergence slit: 0.2 mm, divergence vertical restriction slit: 2 mm Scattering slit: 2°, light-receiving slit: 0.15 mm Offset angle: 0°

Goniometer radius: 285 mm, optical system: focusing method

Attachment: ASC-48

Slit: slit for D/teX Ultra

Detector: D/teX Ultra

Incident-monochro: CBO

Ni-Kβ filter: None

Speed of revolution: 50 rpm

Presence or absence of a peak was determined as follows.

First, in the obtained XRD pattern, an average value of cps in ranges of 14.0 to 14.5° and 16.0 to 16.5° at 2θ was adopted as an intensity A of the background (BG).

Next, when a maximum value of cps in a range of 14.5 to 16.0° was adopted as a peak intensity B, and a difference between the peak intensity B and the intensity A of the background (BG) was 25 cps or more, it was determined that a peak was present.

Then, when a peak was present in a range of 14.0 to 16.5°, "presence" was shown in the table, and when it was not present, "absence" was shown.

In addition, a ratio of a peak intensity of the peak that is the highest in the peaks present in a range of 14.0 to 16.5° at 2θ of the pattern obtained in the XRD measurement condition 2 with respect to a peak intensity of the peak that is the highest in the peaks present in a range of 18 to 19° at 2θ of the pattern obtained in the XRD measurement condition 1 was shown as "P14.0–16.5°/P18–19°".

(Crystallite Size and Strain)

The measurement of an X-ray diffraction pattern for obtaining a crystallite size was performed under the following measurement condition 3 using an X-ray diffractometer (D8 ADVANCE, manufactured by Bruker AXS K.K.) using a Cu-Kα ray.

Peaks in the X-ray diffraction pattern obtained from a range of diffraction angle 2θ=10 to 120° were analyzed using an analysis software (product name "Topas Version 3") to obtain a crystallite size and a strain.

Meanwhile, on the assumption that the crystal structure is attributed to a cubic crystal of a space group Fd-3m (Origin Choice 2), and Li is present at the 8a site, Mn, M1 element, M2 element, and an excessive Li content a are present at the 16d site, and the 32e site is occupied by 0, a parameter Beq. was fixed to 1, a fraction coordinate and a seat occupancy of 0 in the 32e site was set as a variable, and the calculation was repeatedly performed until the indices Rwp and GOF, which represent the degree of coincidence of an observed intensity with a calculated intensity, converged to Rwp<10.0 and GOF<2.2 as a guide. Incidentally, the crystallite size and the strain were analyzed by using Gauss function to obtain the crystallite size and the strain.

=XRD measurement condition 3=

Ray source: CuKα, operation axis: 2θ/θ, measurement method: continuous, counting unit: cps Initiation angle: 10°, termination angle: 120°

Detector: PSD

Detector Type: VANTEC-1

High Voltage: 5,585 V

Discr. Lower Level: 0.25 V

Discr. Window Width: 0.15 V

Grid Lower Level: 0.075 V

Grid Window Width: 0.524 V

Flood Field Correction: Disabled

Primary radius: 250 mm

Secondary radius: 250 mm

Receiving slit width: 0.1436626 mm

Divergence slit: 0.5°

Filament Length: 12 mm

Sample Length: 25 mm

Receiving Slit Length: 12 mm

Primary Sollers: 2.623°

Secondary Sollers: 2.623°

Lorentzian, 1/Cos: 0.004933548 Th

Voltage: 40 kV, current: 35 mA (Specific Surface Area)

A specific surface area (SSA) of each of the spinel-type lithium-manganese-containing complex oxide powders (samples) obtained in Examples and Comparative Examples was measured as follows.

First, 2.0 g of the sample (powder) was weighed in a glass cell (standard cell) for an automatic specific surface area analyzer, Macsorb (manufactured by Mountech Co., Ltd.), and was set in an auto sampler. The inside of the glass cell was replaced by a nitrogen gas, and then a heat treatment was performed at 250° C. for 15 minutes in the nitrogen gas atmosphere. Thereafter, it was cooled for 4 minutes while allowing a mixed gas of nitrogen and helium to flow. After cooling, the sample (powder) was measured by a BET one-point method.

Meanwhile, as the adsorption gas in the cooling and measurement, a mixed gas of 30% of nitrogen and 70% of helium was used.

<Evaluation of Battery>

By using the spinel-type lithium-manganese-containing complex oxide powders (samples) produced in Examples and Comparative Examples as positive electrode active materials, 2032-type coin batteries and laminate-type batteries were produced, and the following battery performance evaluation test, cycle characteristics evaluation test, and gas generation evaluation test were performed using these batteries.

(Production of Coin Battery)

89 parts by mass of the spinel-type lithium-manganese-containing complex oxide powder (sample) produced in each of Examples and Comparative Examples as a positive electrode active material, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass). In so doing, the PVDF was dissolved in the NMP in advance, and the positive electrode active material and the acetylene black were added thereto. The resultant mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that the temperature was maintained at 70° C. for 2 minutes. Thereafter, the resultant heated sample was dried such that the temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 mm, and was press-consolidated using a roll-press machine at a linear pressure of 3 t/cm. The resultant consolidated foil was then punched to a size of ϕ13 mm. Next, the resultant punched foil was heated up from room temperature to 200° C. in a vacuum state, and was heated and dried such that the temperature was maintained at 200° C. for 6 hours, thereby serving as a positive electrode.

A negative electrode was adopted as metal Li with a size of ϕ14 mm×thickness of 0.6 mm, and a separator (made of porous polyethylene film) that was impregnated with an electrolytic solution prepared by dissolving $LiPF_6$ in a carbonate-based mixed solvent so as to be 1 mol/L, was placed, thereby producing a 2032-type coin battery.

(Battery Performance Evaluation Test: High Potential Region Capacity)

The 2032-type coin battery prepared as described above was subjected to an initial activation using a method described in the following. The battery was charged at 25° C. in a 0.1 C constant current/constant potential up to 4.999 V, and thereafter discharged in a 0.1 C constant current down to 3.0 V. This process was repeated in three cycles. Here, the current value actually set was calculated from the content of the positive electrode active material in the positive electrode.

In the above evaluation, a ratio of A/B was obtained where A denoted a discharge capacity in a range of 4.999 to 4.5 V and B denoted a discharge capacity in a range of 4.999 to 3.0 V. It can be considered that as the ratio of A/B becomes larger, the high potential capacity region is expanded. In Table 1, the value of the high potential capacity region in each of Examples was shown as a relative value when the value of the high potential capacity region in Example 1 was set at 100.

(Production of Laminate-Type Battery)

89 parts by mass of the spinel-type lithium-manganese-containing complex oxide powder (sample) produced in each of Examples and Comparative Examples as a positive electrode active material, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass). In so doing, the PVDF was dissolved in the NMP in advance, and the positive electrode active material and the acetylene black were added thereto. The resultant mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that the temperature was maintained at 70° C. for 2 minutes. Thereafter, the resultant heated sample was dried such that the temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 nm, and was press-consolidated using a roll-press machine at a linear pressure of 3 t/cm. The resultant consolidated foil was then punched into a square of 40 mm×29 mm. Next, the resultant punched foil was heated up from room temperature to 200° C. in a vacuum state, and was heated and dried such that the temperature was maintained at 200° C. for 6 hours, thereby serving as a positive electrode.

The positive electrode sheet thus obtained was served as a positive electrode, and a negative electrode sheet (electrode capacity of 1.6 mAh/cm$^2$, manufactured by Piotrek Co., Ltd.) on which natural spherical graphite was coated was cut to a size of 3.1 cm×4.2 cm to serve as a negative electrode. A separator (made of porous polyethylene film) that was impregnated with an electrolytic solution prepared by dissolving $LiPF_6$ in a carbonate-based mixed solvent so as to be 1 mol/L, was placed between the positive electrode and the negative electrode, thereby producing a laminate-type battery.

(Evaluation of 45° C. Cycle Characteristics: Capacity Retention Rate)

The laminate-type battery prepared as described above was subjected to an initial activation using a method described in the following. The battery was left to stand for 12 hours after the production. Thereafter, the battery was charged at 25° C. in a 0.1 C constant current/constant potential up to 4.9 V, and then discharged in a 0.1 C constant current down to 2.9 V. The above process of charging and discharging was repeated in three cycles. Here, the current value actually set was calculated from the content of the positive electrode active material in the positive electrode.

A charge and discharge test was performed using the laminate-type battery after being subjected to the initial activation as described above, and the high-temperature charge-discharge cycle ability was evaluated according to the following method. A cell was put in an environmental testing chamber whose environmental temperature at which the cell is charged and discharged was set at 45° C. to be able to be charged and discharged. The cell was left to stand for 4 hours such that the cell temperature became the environmental temperature, and thereafter, with the charge and discharge range being set at 4.9 to 2.9 V, the charge and discharge was performed one cycle in which the charge was performed in a 0.1 C constant current/constant potential and the discharge was performed in a 0.1 C constant current, and the charge and discharge cycle at 1 C was then performed 199 times. C rate was calculated on the basis of 25° C. in the initial activation and the discharge capacity at the 3rd cycle.

The percentage (%) of the value obtained by dividing the discharge capacity at the 199th cycle by the discharge capacity at the 2nd cycle was obtained as a value for high-temperature charge-discharge cycle ability.

In Table 1, the value for high-temperature charge-discharge cycle ability ("capacity retention rate") from each of Examples and Comparative Examples was described as a relative value when the value for high-temperature charge-discharge cycle ability of Comparative Example 1 was set at 100.

(Output Characteristics Evaluation Test)

The laminate-type battery produced by the method described above was left to stand for 12 hours. The battery was then charged to 4.9 V at 25° C. in a 0.05 C constant current/constant potential, and thereafter discharged to 2.9 V in a constant current. Thereafter, the battery was charged up to the capacity equivalent to 60% when the discharge capacity was set at 100% (hereinafter, referred to as SOC60%), and was open-circuited for 10 minutes. The laminate-type battery that was charged to SOC60% was discharged at a current value equivalent to 3 C, which was calculated from the first discharge capacity, using an electrochemical measurement system (HZ-7000: HAG1232m, manufactured by Hokuto Denko Corp.) for 10 seconds, and was open-circuited for 75 seconds.

As an index of the output evaluation, a value of $W=1/(W1-W2)\times100$ was used. Each of the values is as follows.

$$W1=V1\times I, W2=V2\times I$$

I denotes a current value equivalent to 3 C, V1 denotes a natural potential just before starting the measurement, and V2 denotes a potential when a 3 C current is applied for 10 seconds. Thus, W1 can denote an output value just before starting the measurement, and W2 can denote an output value after the measurement. Accordingly, (W1−W2) means an amount of reduction of the output, and when its inverse number becomes large, it means that the amount of reduction of the output is small, that is, the output characteristics is enhanced.

Meanwhile, in Table 1, each of the values was described as a relative value when the value of Comparative Example 1 was set at 100.

(Gas Generation Evaluation Test)

The laminate-type battery produced by the method described above was left to stand for 12 hours. The battery was then charged to 4.9 V at 25° C. in a 0.05 C constant current/constant potential, and thereafter discharged to 2.9 V in a constant current. Thereafter, the measurement environment temperature was set to 45° C., and the laminate-type battery was left to stand for 4 hours. Subsequently, the battery was charged to 4.9 V at 0.05 C and maintained the voltage for 7 days, and thereafter discharged to 2.9 V. An amount of gas generation (mL) generated up to this stage was measured by a volumetric immersion method (solvent replacement method based on Archimedes' principle). An amount of gas generation per positive electrode active material amount (mL/g) was calculated from the obtained gas generation amount and the positive electrode active material amount in the positive electrode sheet. Here, each of the results was described in the table as an index when the value of Comparative Example 1 was set at 100.

(Rate Characteristics Evaluation Test)

A rate characteristics evaluation was performed according to the following method, using the 2032-type coin battery produced by the method described above.

The battery after the initial activation was charged at a current value equivalent to 0.1 C, and was then discharged at 0.2 C. The discharge rate of this operation was changed to values equivalent to 0.33, 0.5, 1, 3, and 5 C, and current charge and discharge was performed. A value obtained by dividing a discharge capacity at the current value equivalent to 5 C by a discharge capacity at 0.1 C was defined as an index of the rate characteristics. When the value is larger, the rate characteristics are more excellent. Here, each of the results was described in the table as an index when the value of Comparative Example 1 was set at 100.

The term, substitution element species in the following Table 1 means constituent elements of spinel-type lithium-manganese-containing complex oxide other than Li, Mn, Ni, and O.

TABLE 1

|  |  | Examples | | | | | | | | | | | | Comparative Examples | |
|---|---|---|---|---|---|---|---|---|---|---|---|---|---|---|---|
|  |  | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 |
| Li | x | 1.04 | 1.04 | 1.04 | 1.05 | 1.04 | 1.04 | 1.04 | 1.04 | 1.05 | 1.02 | 1.02 | 1.03 | 1.02 | 1.04 |
| M1 | y | 0.44 | 0.44 | 0.44 | 0.41 | 0.44 | 0.44 | 0.39 | 0.37 | 0.42 | 0.44 | 0.44 | 0.44 | 0.44 | 0.44 |
| Mn | 3-x-y-z | 1.32 | 1.32 | 1.32 | 1.34 | 1.32 | 1.32 | 1.43 | 1.46 | 1.39 | 1.35 | 1.34 | 1.34 | 1.39 | 1.32 |
| M2 | z | 0.20 | 0.20 | 0.20 | 0.20 | 0.20 | 0.20 | 0.14 | 0.13 | 0.14 | 0.19 | 0.20 | 0.19 | 0.15 | 0.20 |
| Substitution element species | — | Ti | Ti | Ti | Ti | Ti | Ti | Ti, Al, Co | Ti | Ti, Al | Ti, Al | Ti, Al | Ti, Al | Ti | Ti |
| Secondary particle diameter (D50) | μm | 3.3 | 4.3 | 4.9 | 3.5 | 4.1 | 6.1 | 5.5 | 5.8 | 5.7 | 5.6 | 5.8 | 5.7 | 16.5 | 8.4 |
| (Mode diameter)/(D50) | % | 20 | 8 | 4 | 3 | 4 | 12 | 9 | 3 | 6 | 6 | 3 | 5 | 11 | 1 |
| (Mode diameter-D10)/mode diameter × 100 | % | 44 | 45 | 43 | 36 | 44 | 45 | 45 | 43 | 46 | 44 | 42 | 43 | 60 | 52 |
| Average primary particle diameter | — | 0.97 | 0.86 | 0.75 | 0.87 | 0.81 | 0.57 | 0.67 | 0.40 | 0.32 | 0.30 | 0.26 | 0.39 | 0.29 | 0.03 |
| Crystallite size | nm | 125 | 149 | 114 | 142 | 155 | 154 | 169 | 178 | 163 | 174 | 161 | 164 | 163 | 72 |
| Crystallite size/primary average particle diameter | — | 0.04 | 0.04 | 0.03 | 0.05 | 0.05 | 0.04 | 0.05 | 0.08 | 0.09 | 0.10 | 0.11 | 0.07 | 0.03 | 0.33 |
| Mode diameter | μm | 2.8 | 4.6 | 5.0 | 3.6 | 4.2 | 5.5 | 6.0 | 6.0 | 6.0 | 6.0 | 6.0 | 6.0 | 18.5 | 8.5 |
| Average primary particle diameter | μm | 3.24 | 3.65 | 3.63 | 3.03 | 3.29 | 3.51 | 3.70 | 2.30 | 1.80 | 1.70 | 1.60 | 2.20 | 4.89 | 0.22 |

TABLE 1-continued

| | | Examples | | | | | | | | | | | | Comparative Examples | |
|---|---|---|---|---|---|---|---|---|---|---|---|---|---|---|---|
| | | Example 1 | Example 2 | Example 3 | Example 4 | Example 5 | Example 6 | Example 7 | Example 8 | Example 9 | Example 10 | Example 11 | Example 12 | Comparative Example 1 | Comparative Example 2 |
| Dmin | μm | 0.8 | 1.1 | 1.1 | 1.3 | 1.1 | 1.3 | 1.9 | 1.8 | 1.5 | 1.8 | 1.8 | 1.8 | 2.1 | 0.6 |
| Strain | — | 0.14 | 0.07 | 0.02 | 0.00 | 0.06 | 0.07 | 0.03 | 0.03 | 0.02 | 0.00 | 0.03 | 0.00 | 0.07 | 0.36 |
| D10 | μm | 1.5 | 2.6 | 2.9 | 2.3 | 2.4 | 3.0 | 3.3 | 3.4 | 3.2 | 3.4 | 3.5 | 3.4 | 7.3 | 4.1 |
| Specific surface area | m²/g | 2.0 | 0.8 | 0.7 | 1.0 | 0.8 | 0.7 | 0.7 | 0.7 | 0.7 | 0.7 | 0.9 | 0.9 | 0.3 | 6.7 |
| Presence or absence of surface treatment layer | — | Absence | Absence | Presence | Presence | Absence | Presence | Absence | Absence | Absence | Absence | Absence | Absence | Absence | Absence |
| 14-16.5° peak | — | Absence | Absence | Absence | Absence | Presence | Presence | Absence | Absence | Absence | Absence | Absence | Absence | Absence | — |
| P14.0-16.5° | cps | — | — | — | — | 58 | 32 | — | — | — | — | — | — | 0 | — |
| P18-19° | % | — | — | — | — | 0.12 | 0.07 | — | — | — | — | — | — | 0 | — |
| Output characteristics index | — | 121 | 124 | 110 | 113 | 142 | 156 | 176 | 169 | 135 | 135 | 130 | 121 | 100 | 92 |
| Gas generation amount index | — | 62 | 77 | 19 | 22 | 61 | 66 | 58 | 55 | 63 | 84 | 63 | 73 | 100 | 164 |
| Capacity retention rate index | — | 123 | 131 | 162 | 153 | 138 | 133 | 138 | 126 | 133 | 130 | 131 | 132 | 100 | 8 |
| Rate characteristics index | — | — | — | 134 | 143 | — | 103 | — | — | — | — | — | — | 100 | — |
| High potential region capacity index | — | — | — | — | — | 109 | 109 | — | — | — | — | — | — | 100 | — |

(Consideration)

In any of Examples 1 to 12, from the results of XRD measurements, an analysis result in which the obtained lithium-manganese-containing complex oxide was a 5 V-class spinel which was fitted to a crystal structure model of a cubic crystal of a space group Fd-3m (Origin Choice 2), wherein Rwp and S which represented the degree of coincidence of an observed intensity with a calculated intensity were Rwp<10 or S<2.5, was obtained. In addition, from the results of the battery performance evaluation tests, it was confirmed that the obtained lithium-manganese-containing complex oxide had an operating potential of 4.5 V or more with respect to a metal Li reference potential.

Further, the ratio of crystallite size/average primary particle diameter was less than 1, and thus it was confirmed that the primary particle was a polycrystal in any of the spinel-type lithium-manganese-containing complex oxide powders (samples) of Examples 1 to 12 and Comparative Examples 1 to 2.

From the results of Examples described above and the results of the test which have been so far conducted, the primary particle of the 5 V-class spinel was a polycrystal, D50 in the volume-based particle size distribution measurement was 0.5 to 9 μm, a relation among mode diameter, D50, and D10 was specified, and a relation between primary particle diameter and D50 was specified. Consequently, the dispersibility of primary particles could be enhanced, and the particle size distribution could be made closer to a normal distribution and have a narrow peak. As a result, the output characteristics and the charge-discharge cycle ability could be simultaneously enhanced while suppressing the gas generation. For the above reason, it was found that the first problem could be solved.

From such a viewpoint, in regard to the spinel-type lithium-manganese-containing complex oxide comprising at least Li, Mn, O, and two or more other elements and having an operating potential of 4.5 V or more with respect to a metal Li reference potential, it has been found that D50 according to a measurement of a volume-based particle size distribution obtained via measurements by a laser diffraction scattering-type particle size distribution measurement method is preferably 0.5 to 9 μm, a value of (|mode diameter−D50|/mode diameter)×100, which is calculated from a mode diameter, D50, and D10, is preferably 0 to 25%, and a value of (|mode diameter−D10|/mode diameter)×100 is preferably 20 to 58%.

In addition, it has been found that the ratio of average primary particle diameter/D50, which is calculated from the average primary particle diameter calculated from the particle diameter calculated from the SEM image and the D50 is preferably 0.20 to 0.99.

Further, from the results of Examples described above and the results of the test which have been so far conducted, it has been found that when a layer (referred to as "layer A") comprising at least titanium, aluminum, zirconium, or two or more kinds of these is present (Examples 3, 4, and 6), the 5 V-class spinel comprising Li, Mn, O, and two or more other elements becomes more excellent in rate characteristics, compared to the 5 V-class spinel in which the layer is not present. Accordingly, it has been found that the second problem can be solved.

Furthermore, from the results of Examples described above and the results of the test which have been so far conducted, in regard to the 5 V-class spinel comprising Li, Mn, O, and two or more other elements, it has been found that when a peak is present in a range of 14.0 to 16.5° at 2θ in an X-ray diffraction pattern (Examples 5 and 6), a shoulder at near 4 V is disappeared, a plateau region at near 4.5 V is expanded, a high potential capacity region is expanded, and thus energy density is increased, compared to the 5 V-class spinel in which the peak is not present in a range of 14.0 to 16.5° at 2θ in an X-ray diffraction pattern. Accordingly, it has been found that the third problem can be solved.

The invention claimed is:

1. A spinel-type lithium-manganese-containing complex oxide,
comprising at least Li, Mn, O, and two or more other elements, and
having an operating potential of 4.5 V or more with respect to a metal Li reference potential,
wherein, with regard to a D50, a mode diameter, and a D10 according to a measurement of a volume-based particle size distribution obtained via measurements by a laser diffraction scattering-type particle size distribution measurement method (referred to as "D50", "mode diameter", and "D10" respectively),
a D50 is 0.5 to 9 μm,
a value of (|mode diameter−D50|/mode diameter)×100 is 0 to 25%,
a value of (|mode diameter−D10|/mode diameter)×100 is 20 to 58%,
a ratio of average primary particle diameter/D50, which is calculated from an average primary particle diameter calculated from a SEM (scanning-type electron microscope) image obtained by a SEM and the D50 is 0.20 to 0.99, and
a primary particle is a polycrystal.

2. The spinel-type lithium-manganese-containing complex oxide according to claim 1, which is represented by a general formula $[Li_x(M1_yM2_zMn_{2-x-y-z})O_{4-\delta}]$ (where $1.00 \leq x \leq 1.20$, $0.20 \leq y \leq 1.20$, $0 \leq z \leq 0.5$, $0 \leq \delta \leq 0.2$, M1 in the formula represents one or two or more elements selected from the group consisting of Ni, Co, and Fe, and M2 represents one element selected from the group consisting of Na, Mg, Al, K, Ca, Ti, V, Cr, Cu, Ga, Y, Zr, Nb, Mo, In, Ta, W, Re, and Ce, or a combination of two or more elements thereof).

3. The spinel-type lithium-manganese-containing complex oxide according to claim 2, wherein the mode diameter is 0.4 to 11 μm.

4. The spinel-type lithium-manganese-containing complex oxide according to claim 1, which is represented by a general formula $[Li_x(Ni_yM_zMn_{2-x-y-z})O_{4-\delta}]$ (where $1.00 \leq x \leq 1.20$, $0.20 \leq y \leq 0.70$, $0 \leq z \leq 0.5$, $0 \leq \delta \leq 0.2$, M in the formula represents one element selected from the group consisting of Na, Mg, Al, K, Ca, Ti, V, Cr, Fe, Co, Cu, Ga, Y, Zr, Nb, Mo, In, Ta, W, Re, and Ce, or a combination of two or more elements thereof).

5. The spinel-type lithium-manganese-containing complex oxide according to claim 4, wherein the mode diameter is 0.4 to 11 μm.

6. The spinel-type lithium-manganese-containing complex oxide according to claim 1, wherein the mode diameter is 0.4 to 11 μm.

7. The spinel-type lithium-manganese-containing complex oxide according to claim 1, the average primary particle diameter which is calculated from a SEM (scanning-type electron microscope) image obtained by a SEM is 0.3 to 5.0 μm.

8. The spinel-type lithium-manganese-containing complex oxide according to claim 1, wherein a Dmin in a result of measuring a volume-based particle size distribution obtained via measurements by a laser diffraction scattering-type particle size distribution measurement method is 0.1 to 2.0 μm.

9. The spinel-type lithium-manganese-containing complex oxide according to claim 1, wherein, in an X-ray diffraction pattern measured by a powder X-ray diffractometer (XRD), a value of a strain obtained by a Rietveld analysis is 0.00 to 0.35.

10. The spinel-type lithium-manganese-containing complex oxide according to claim 1, having a layer (referred to as "layer A") comprising at least titanium, aluminum, zirconium, or two or more kinds of these on a part of a surface of lithium-manganese complex oxide particles (also referred to as "core particles") operating at a charging voltage in a region exceeding 4.5 V in a metal Li reference potential.

11. The spinel-type lithium-manganese-containing complex oxide according to claim 10, wherein the layer A further comprises phosphorus (P).

12. The spinel-type lithium-manganese-containing complex oxide according to claim 11, wherein a thickness of the layer A is 0.01 to 200 nm.

13. The spinel-type lithium-manganese-containing complex oxide according to claim 10, wherein a thickness of the layer A is 0.01 to 200 nm.

14. The spinel-type lithium-manganese-containing complex oxide according to claim 1, wherein, in an X-ray diffraction pattern measured by a powder X-ray diffractometer (XRD), a peak is present in a range of 14.0 to 16.5° at 2θ.

15. The spinel-type lithium-manganese-containing complex oxide according to claim 1, wherein, in an X-ray diffraction pattern measured by a powder X-ray diffractometer (XRD), a ratio of a peak intensity of the peak that is the highest in the peaks present in a range of 14.0 to 16.5° at 2θ with respect to a peak intensity of the peak that is the highest in the peaks present in a range of 18 to 19° at 2θ is more than 0.05%.

16. A lithium secondary battery having the spinel-type lithium-manganese-containing complex oxide according to claim 1 as a positive electrode active material.

17. The spinel-type lithium-manganese-containing complex oxide according to claim 1, wherein D10 according to a measurement of a volume-based particle size distribution obtained via measurements by a laser diffraction scattering-type particle size distribution measurement method is 0.2 μm to 4.0 μm.

18. The spinel-type lithium-manganese-containing complex oxide according to claim 1, wherein a specific surface area is 0.5 m$^2$/g or more or 5.0 m$^2$/g or less.

19. A spinel-type lithium-manganese-containing complex oxide,
comprising at least Li, Mn, O, and two or more other elements, and
having an operating potential of 4.5 V or more with respect to a metal Li reference potential,
wherein, with regard to a D50, a mode diameter, and a D10,
a D50 is 0.5 to 9 μm,
a value of (|mode diameter-D50|/mode diameter)×100 is 0 to 25%,
a value of (|mode diameter-D10|/mode diameter)×100 is 20 to 58%,
a ratio of average primary particle diameter/D50, which is calculated from an average primary particle diameter calculated from a SEM (scanning-type electron microscope) image obtained by a SEM and the D50 is 0.20 to 0.99,
a crystallite size is 80 to 490 nm, and
a ratio of crystallite size/average primary particle diameter, which is calculated from the crystallite size and the average primary particle diameter is 0.01 to 0.32.

20. The spinel-type lithium-manganese-containing complex oxide according to claim 19, which is represented by a general formula [Li$_x$(M1$_y$M2$_z$Mn$_{2-x-y-z}$)O$_{4-\delta}$] (where 1.00≤x≤1.20, 0.20≤y≤1.20, 0≤z≤0.5, 0≤δ≤0.2, M1 in the formula represents one or two or more elements selected from the group consisting of Ni, Co, and Fe, and M2 represents one element selected from the group consisting of Na, Mg, Al, K, Ca, Ti, V, Cr, Cu, Ga, Y, Zr, Nb, Mo, In, Ta, W, Re, and Ce, or a combination of two or more elements thereof).

21. The spinel-type lithium-manganese-containing complex oxide according to claim 19, which is represented by a general formula [Li$_x$(Ni$_y$M$_z$Mn$_{2-x-y-z}$)O$_{4-\delta}$] (where 1.00≤x≤1.20, 0.20≤y≤0.70, 0≤z≤0.5, 0≤δ≤0.2, M in the formula represents one element selected from the group consisting of Na, Mg, Al, K, Ca, Ti, V, Cr, Fe, Co, Cu, Ga, Y, Zr, Nb, Mo, In, Ta, W, Re, and Ce, or a combination of two or more elements thereof).

22. The spinel-type lithium-manganese-containing complex oxide according to claim 19, wherein the mode diameter is 0.4 to 11 μm.

* * * * *

UNITED STATES PATENT AND TRADEMARK OFFICE
CERTIFICATE OF CORRECTION

PATENT NO. : 10,468,677 B2
APPLICATION NO. : 16/080175
DATED : November 5, 2019
INVENTOR(S) : Kyohei Yamaguchi et al.

Page 1 of 1

It is certified that error appears in the above-identified patent and that said Letters Patent is hereby corrected as shown below:

On the Title Page

Item [74], Attorney, Agent, or Firm, Line 1, delete "Web" and insert -- Webb --

Signed and Sealed this
Tenth Day of March, 2020

Andrei Iancu
*Director of the United States Patent and Trademark Office*